United States Patent
Kimura

(10) Patent No.: US 7,106,218 B2
(45) Date of Patent: Sep. 12, 2006

(54) METHOD AND APPARATUS FOR THE DISPLAY OF DETAILED MAP INFORMATION

(75) Inventor: Tsuyoshi Kimura, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 259 days.

(21) Appl. No.: 10/894,961

(22) Filed: Jul. 20, 2004

(65) Prior Publication Data

US 2005/0024238 A1 Feb. 3, 2005

(30) Foreign Application Priority Data

Jul. 23, 2003 (JP) .............................. 2003-200817

(51) Int. Cl.
*G08G 1/123* (2006.01)

(52) U.S. Cl. .............................. 340/995.1; 340/995.14; 701/207

(58) Field of Classification Search .............. 340/995.1
See application file for complete search history.

(56) References Cited

U.S. PATENT DOCUMENTS

| | | | | |
|---|---|---|---|---|
| 5,848,373 A | * | 12/1998 | DeLorme et al. | 701/200 |
| 6,061,629 A | * | 5/2000 | Yano et al. | 701/209 |
| 6,122,592 A | * | 9/2000 | Arakawa et al. | 701/201 |
| 6,202,026 B1 | | 3/2001 | Nimura et al. | 701/211 |
| 2002/0112237 A1 | * | 8/2002 | Kelts | 725/39 |
| 2004/0215389 A1 | * | 10/2004 | Hirose | 701/209 |

* cited by examiner

*Primary Examiner*—Thomas Mullen
*Assistant Examiner*—George A. Bugg
(74) *Attorney, Agent, or Firm*—Brinks Hofer Gilson & Lione

(57) ABSTRACT

In a separate-window-display map search-and-display unit, where a current position or a cursor position arrives at a predetermined area near the outer circumference of a screen image during cursor-moving map scroll display is performed, a map-display-scale calculation unit calculates a wide-area map on a predetermined scale for displaying the current position and the cursor position on the same screen and a two-point-display map-search display searches for and displays a predetermined map. A separate-frame-window-display detailed-map search-and-display unit displays a current-position-centered detailed map and a cursor-position-centered detailed map in separate-frame windows.

21 Claims, 14 Drawing Sheets

FIG. 16A
PRIOR ART 1

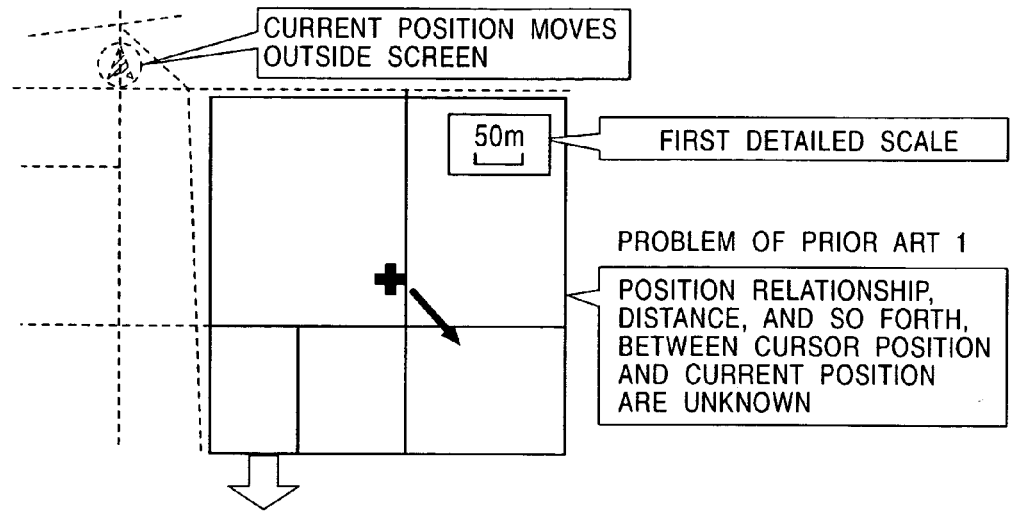

CURRENT POSITION MOVES OUTSIDE SCREEN

50m — FIRST DETAILED SCALE

PROBLEM OF PRIOR ART 1

POSITION RELATIONSHIP, DISTANCE, AND SO FORTH, BETWEEN CURSOR POSITION AND CURRENT POSITION ARE UNKNOWN

FIG. 16B
PRIOR ART 2

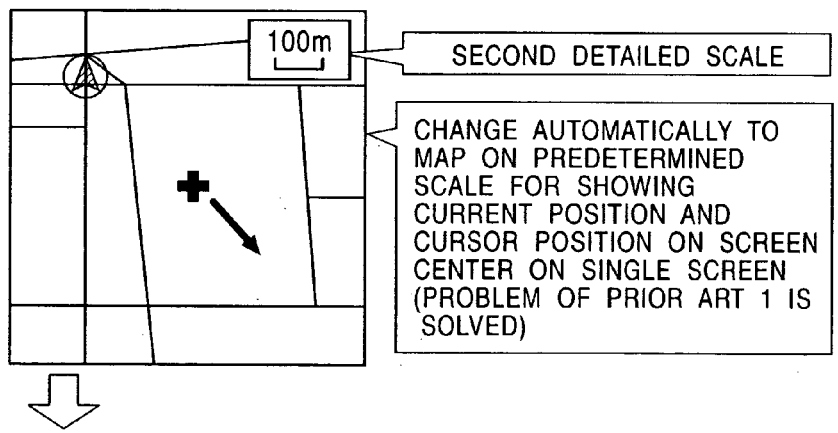

100m — SECOND DETAILED SCALE

CHANGE AUTOMATICALLY TO MAP ON PREDETERMINED SCALE FOR SHOWING CURRENT POSITION AND CURSOR POSITION ON SCREEN CENTER ON SINGLE SCREEN (PROBLEM OF PRIOR ART 1 IS SOLVED)

FIG. 16C
PRIOR ART 2

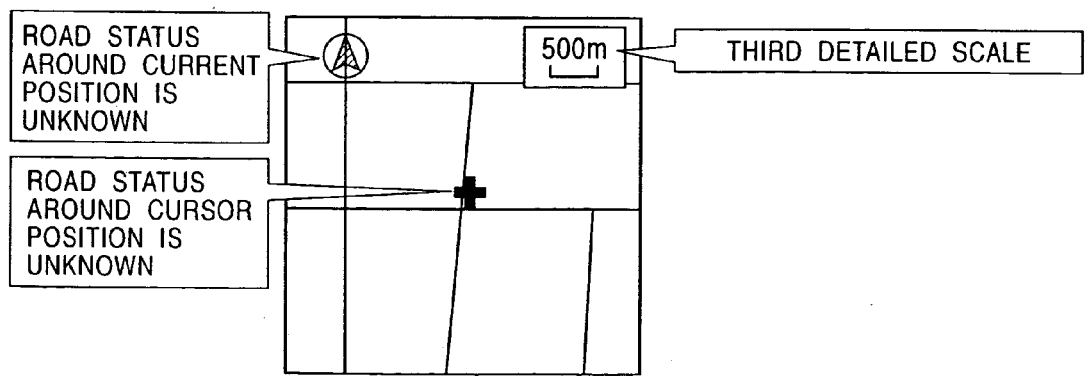

PROBLEM OF PRIOR ART 2

ROAD STATUS AROUND CURRENT POSITION IS UNKNOWN

ROAD STATUS AROUND CURSOR POSITION IS UNKNOWN

500m — THIRD DETAILED SCALE

METHOD AND APPARATUS FOR THE DISPLAY OF DETAILED MAP INFORMATION

BACKGROUND OF THE INVENTION

1. Field of the Invention

The present invention relates to a map search-and-display method for capturing the positioned relationship between two points at a predetermined distance from each other and obtaining detailed maps showing the two points and areas therearound. The present invention further relates to a map display apparatus for performing the above-described method. The above-described method and apparatus may be used in a navigation apparatus.

2. Description of the Related Art

For example, general navigation systems include a map-and-information data recording medium storing map data for drawing a map and facility-information data for searching a facility or the like. The map-and-information data recording medium can be a CD-ROM, a DVD-ROM, a hard disk, and so forth. Typical navigation systems further include a data capture device for capturing data of the map-and-information data recording medium, a display device for displaying a map or the like, and a vehicle-position detection device for detecting the current position and travel direction of a vehicle by using a self-contained navigation device including a GPS receiver, a running-distance sensor, and a gyrocompass. Subsequently, it becomes possible to capture map data including the vehicle current position from the map-and-information data recording medium, draw the image of a map showing areas around the vehicle current position on a screen of the display device based on the captured map data, display a vehicle-position mark on the display screen, scroll the map image according to the vehicle movement, and fix the map image on the screen and move the vehicle-position mark, so as to understand where the vehicle is located at a glance.

The map data stored in the map-and-information data recording medium is separated by a suitable longitude width and a suitable latitude width according to various scale levels. Data on a road or the like is stored, as a cluster of coordinates of nodes represented by longitudes and latitudes. The road data includes at least two connected nodes, and the map data includes a road layer having a road list, a node table, an intersection-forming node list, and so forth, a background layer for displaying a road, a building, a facility, a park, a river, and so forth, on the map image, and information data for displaying characters, map symbols, and so forth, of an administrative-tract name such as the names of a city, a town, and a village, the road name, the intersection name, the facility name, and so forth.

Further, the navigation systems have a route-guidance function so that a user can easily travel toward a predetermined destination or a passing spot (hereinafter referred to as an destination) without taking a wrong road. According to the route-guidance function, it becomes possible to set the destination by using various units that will be described later and calculate and propose a suitable route fulfilling various requirements from among routes linking a starting point with the destination. Further, it becomes possible to store the data on a route selected by the user, as guidance-route data, and display the guidance route, as a thick line of color different from that of lines of other roads, on the image map during traveling. Further, where the distance between the vehicle and an intersection where the vehicle should change its travel direction on the guidance route becomes shorter than a predetermined distance, the intersection is enlarged, an arrow mark or the like indicating the changed travel direction is displayed, and speech guidance on right or left turn is provided. Subsequently, it becomes possible to guide the user to the destination.

In the case of the above-described navigation systems, it is necessary to set the destination to which the vehicle travels at the current position where the vehicle starts traveling. For setting the destination, the address of the destination is inputted directly. However, the destination address is inputted according a guidance image, where the guidance image gradually changes from a wide-area name to a narrow-area name. Further, the phone number of a predetermined facility or the like stored in the map-and-information data recording medium with the location information thereof is inputted, so as to search a map showing a point where the predetermined facility exists. Otherwise, information of the predetermined facility is narrowed down according to a genre and an area, so as to search the map showing the point where the predetermined facility exists.

According to the above-described method for searching a destination, the user must remember the address of a predetermined point correctly for searching for the predetermined point by address. However, where the user does not remember the address correctly, it takes significant time and many procedures for searching the predetermined point. Further, even though inputting the phone number of the predetermined point is an easy method for searching for the predetermined point, this method is useless for searching a map showing a facility whose phone number is unknown or an area other than areas around a facility whose phone-number data is known.

However, a map-scroll search method performed by moving a cursor is widely used, as a map-search method that can be performed easily and smoothly by the user. According to this method, the cursor is displayed on a screen and moved from the current position displayed on the screen by using a remote control or the like, whereby a map displayed on the screen is scrolled in all directions. Further, the scroll speed is arbitrarily adjusted by detecting the cursor movement and the scale of the map is changed, as required.

The map-scroll search method performed by moving the cursor will be described as below. First, as shown in FIG. 15A, a current-position centered map on a first detailed scale, which is the most detailed scale of all, is displayed, for example. The user starts scrolling the map for performing a cursor-moving map search process. In this process, the user moves the cursor for setting a destination and displays and designates a predetermined point on the map, as the destination. Subsequently, a cursor-position centered map is displayed on the screen at all times. As a result, the cursor is fixed on the screen center and the map moves in a reverse direction, as shown in FIG. 15B. Therefore, the current position gradually moves in a direction reverse to the cursor moving direction, whereby a new map centered on the cursor regarded by the user is displayed continuously.

Accordingly, where the cursor is moved in the arrow direction, as shown in FIG. 15B, the current position often disappears from the screen, as shown in FIG. 15C. As a result, the current position is not displayed on the screen and only the cursor position is displayed on the screen center, as shown in FIG. 16A. Where the cursor is moved up and down, or from side to side on the above-described screen, it becomes difficult to know the current-position direction and the distance between the current position and the cursor position. In this case, the user changes from the first detailed scale to a predetermined scale for a wide-area map for displaying an area wider than the area shown in the map on the first detailed scale, so as to display the current position on the screen.

However, where the cursor is moved to a predetermined point distant from the current position, as shown in FIG. 16A, and the user wishes to display the current position and the cursor position on the same screen, it is often insufficient to change the first detailed map scale to the next detailed map scale, that is, a second detailed map scale. That is to say, the user often has to change the map scale several times for displaying a wider area map.

Because it is troublesome to repeat the above-described process for performing the cursor-moving map search, the applicant of the present invention has proposed a technology disclosed in Japanese Unexamined Patent Application Publication No. 2002-286467. According to this technology, where the current position is disappearing from the screen, as shown in FIG. 15C, it becomes possible to display a map on a predetermined scale for displaying the cursor position and the current position on the same screen automatically, without changing the cursor position on the screen center regarded by the user on the currently-displayed map, as shown in FIG. 16B. The map is calculated based on data including the distance between the current position and the cursor position, the map-scale rate, the screen size, and so forth. FIG. 16B shows an example where the detailed scale is changed from the first detailed scale to the next detailed scale for displaying a wider area, that is, the second detailed scale.

According to the above-described technology, the current position can be displayed on the screen all the time irrespective of how the cursor is moved by the user. Subsequently, the cursor-moving map search process can be performed easily. However, where the cursor is moved away from the current position, a new map showing a wider area than the map on the second detailed scale is displayed, as shown in FIG. 16C. The scale of the new map is referred to as a third detailed scale. In the case of the map on the third detailed scale, however, only main roads are displayed in areas around the current position and the cursor position. Therefore, it is difficult to see the real road status around the current position and the cursor position by observing the map on the third detailed scale.

For example, where the user tries to find a predetermined convenience store on a predetermined point by scrolling a map showing an excessively wide area, the name of the predetermined point is often not displayed. Particularly, the predetermined convenience store is not displayed in most cases. Therefore, where it is estimated that the predetermined point is near the cursor position, the user changes the map scale manually, so as to display a new map on a more detailed scale than that of the currently displayed map. Then, the user determines whether or not the point or the convenience store exists by searching the new map. Where neither the point nor the convenience store exists on the map screen, the above-described operations are repeated, so as to perform a search for a predetermined map repetitively.

As has been described above, the relationship between the current position and the cursor position is clearly understood by displaying the map showing the two positions on the same screen. However, because the map shows a wide area, it becomes difficult to obtain detailed map information for the two positions. This problem is not limited to the case where the two positions are displayed during the map is searched by moving the cursor. For example, where a search is made for a facility, the position relationship between the facility and the current position is confirmed through a map displayed on the same screen. However, where the user wishes to obtain a detailed map for the facility, a detailed map for areas around the facility, a detailed map for the current position, and a detailed map for areas around the current position, the above-described problem also occurs. According to the known map display method, the map showing the current position and a searched facility is displayed and the map is switched to a detailed map centered on a facility to be searched. Further, display operations including a step of displaying a detailed map centered on the current position by moving the cursor, for example, need to be repeated.

Further, where the user is going to use a highway and wishes to select an interchange for entering the highway from an ordinary road, or an interchange for going from the highway to the ordinary road, a predetermined interchange is displayed. However, where the user wishes to make a search for an interchange more suitable than the first interchange, based on a highway route map, the user wants to see a highway route map displaying the first interchange and the more suitable interchange for understanding the position relationship between the two interchanges and a detailed map for understanding the ordinary-road status around each of the interchanges. In this case, according to the known map-display method, it becomes necessary to switch between a highway route map on a suitable scale and a detailed map showing the ordinary-road status around each of the interchanges by performing many display operations.

SUMMARY OF THE INVENTION

Accordingly, it is an object of the present invention to provide a map search-and-display method and an apparatus for performing the method. According to the map search-and-display method, it becomes possible to display two points with a predetermined distance therebetween on a single screen, so as to understand the position relationship between the two points easily and observe detailed maps showing areas around the two points at the same time.

A map search-and-display method according to an aspect of the present invention comprises the steps of displaying a two-point display map showing a first point and a second point at a predetermined distance from each other, and displaying a detailed map for at least one of the two points in a separate-frame window at a predetermined position on the two-point display map. The predetermined position corresponds to the point shown in the detailed map.

According to the above-described map search-and-display method, it becomes possible to display the two points on a single screen, even though the distance between the first point and the second point increases. Therefore, the position relationship between the two points can be clearly understood without performing complicated operations. Further, even though the two points are distant from each other, a wide area map showing the two points is provided. Therefore, the road status around each of the points can be easily understood.

Preferably, the first point indicates a current position and the second point indicates a cursor position provided for scrolling the two-point display map. Subsequently, where the user wishes to make a search for a predetermined point by scrolling the map by moving the cursor and the point to be searched is distant from the current position, the position relationship between the current position and the cursor position can be clearly understood. Further, since the two points are displayed in a wide-area map, the road status or the like around the two points can be understood.

Preferably, the first point indicates an interchange shown on a highway-route map and the second point indicates another interchange on the highway-route map. Subsequently, where the ordinary-road status cannot be obtained through the highway-route map, it becomes possible to display an ordinary-road detailed map corresponding to a predetermined interchange. Therefore, it becomes unnecessary to select and display the highway-route map and an ordinary-road map, though it was necessary in the past. Further, because the two maps are displayed simultaneously, the user can make an easy search for a predetermined destination.

Preferably, the first point indicates a current position and the second point indicates the position of a facility searched through facility search. Subsequently, the position of the searched facility and the current position are displayed on the same screen, whereby the position relationship therebetween is clearly shown. Further, because detailed maps for the current position and the facility position are displayed at the same time, it becomes easy to know the detailed road status or the like for each of the positions.

A map search-and-display apparatus according to another aspect of the present invention comprises a two-point-display-map search-and-display device for searching for and displaying a two-point display map showing a first point and a second point at a predetermined distance from each other. The map search-and-display apparatus further comprises a separate-frame-window-display detailed-map search-and-display device for displaying a detailed map for at least one of the two points in a frame separated from the two-point display map.

According to the above-described map search-and-display apparatus, it becomes possible to display the first and second points on the same screen, even though the two points are distant from each other, for displaying various maps, whereby the position relationship between the two points can be easily obtained without performing complicated operations. Further, the detailed maps showing areas around the positions corresponding to those shown on the screen are displayed in the separate frames. Therefore, even though the map showing the two points at a distant from each other is displayed as a wide-area map, the road status around each of the two positions can be easily understood.

Preferably, the first point indicates a current position and the second position indicates a cursor position provided for scrolling the two-point display map. In this case, where the user makes a search for a predetermined point by scrolling the map by moving a cursor, it becomes easier for the user to understand the position relationship between the current position and the cursor position, even though the predetermined point to be searched is distant from the current position. Further, since the two points are displayed in the wide-area map, it becomes easier for the user to understand the road status or the like around the points.

Preferably, the first point indicates a first interchange shown on a highway-route map and the second point indicates a second interchange on the highway-route map. Subsequently, where the ordinary-road status cannot be obtained through the highway-route map, it becomes possible to display an ordinary-road detailed map corresponding to a predetermined interchange. Therefore, it becomes unnecessary to select and display the highway-route map and an ordinary-road map, though it was necessary in the past. Further, because the two maps are displayed simultaneously, the user can make an easy search for a predetermined destination.

Preferably, the first point indicates a current position and the second point indicates the position of a facility searched through facility search. Subsequently, the position of the searched facility and the current position are displayed on the same screen, whereby the position relationship therebetween is clearly shown. Further, since detailed maps for the current position and the facility position are displayed at the same time, it becomes easier to know the detailed road status or the like for each of the positions.

Preferably, the map search-and-display apparatus further comprises a limitation-outer-circumference arrival determination device for determining whether or not either the current position or the cursor position exists in an outer circumference of a screen image, where the outer circumference is provided for limiting entrance of either the current position or the cursor position due to the movement of the cursor position. The map search-and-display apparatus may further comprise a map search-and-display device that searches for and displays a map that shows the current position and the cursor position and that is wider than the currently-displayed map, where the limitation-outer-circumference arrival determination device determines that either the current position or the cursor position exists in the outer circumference. Subsequently, where the user performs map search by moving a cursor and where the current position or the cursor position arrives at the outer circumference of the screen according to the cursor movement, the arrival is detected and a search for a wider-area map is automatically made, so that a map showing the current position and the cursor position is displayed. Therefore, it becomes possible to reliably perform an easy map-scroll search by moving the cursor without performing complicated operations.

Preferably, the outer circumference is an outer-most circumference of the screen image. Therefore, where the current position or the cursor position disappears from the currently-displayed screen and the position relationship therebetween becomes unknown, a search for a wider-area map is automatically made, so as to display a map showing the current position and the cursor position.

Preferably, the outer circumference is inside an outer-most circumference of the screen image, so as to be at a predetermined distance from the outer-most circumference. Subsequently, where the current position or the cursor position is in the predetermined distance from the outer-most circumference on the currently-displayed screen, a search for a wider-area map is automatically made and the map is displayed. Further, where the current position is in the predetermined distance, a predetermined area centered on the current position on the currently displayed map is captured, as it is, and displayed in a separate-frame window. Further, where the current position comes in the predetermined distance from the outer-most circumference during the wide-area map is displayed on a single screen and the separate-frame window for the current position is displayed thereon, it becomes possible to prevent part of the detailed map for the current position from being hidden due to further map scroll performed by moving the cursor.

Preferably, the map search-and-display apparatus further comprises a current-position-centered predetermined-area arrival determination device for determining whether or not the cursor position arrives at a predetermined area centered on the current position, and a map search-and-display device that searches for and displays a map that shows the first and second points and that is more detailed than the currently displayed map, where the current-position-centered predetermined-area arrival determination device determines that the cursor position arrives at the predetermined area. Subsequently, where map search is performed by moving a cursor and where the cursor comes near the current position and the distance therebetween is shorter than a predetermined distance, a more detailed map on a suitable scale is automatically displayed at all times.

Preferably, the detailed map shown in the separate-frame window is displayed on a predetermined position on the two-point display map, where the predetermined position corresponds to the point shown in the detailed map. Subsequently, detailed maps for the two points are displayed in separate-frame windows, so as to correspond to the two points displayed on the two-point display map. Therefore, it becomes easier to grasp the position relationship between the two positions and the road status or the like around the two positions.

Preferably, the detailed map shown in the separate frame is displayed on a predetermined position other than the two-point display map, with reference to either the first point or the second point displayed on the two-point display map. Because the detailed map in the separate frame is displayed on the two-point display map, the obtained map is easier for the user to understand.

Preferably, the two-point-display map search-and-display device comprises a search-center-point selection unit for searching for and displaying a map by selecting one of at least two of a current-position-centered map search-and-display unit for searching for and displaying a map centered on the current position, a cursor-position-centered map search-and-display unit for searching for and displaying a map centered on the cursor position, and a midpoint-centered map search-and-display unit for searching for and displaying a map centered on a midpoint between the current position and the cursor position. Subsequently, it becomes possible to select and display the most suitable map according to the situation for displaying a map showing the current position and the cursor position.

Preferably, the map search-and-display apparatus further comprises a search-method selection device for selecting between the separate-frame-window-display detailed-map search-and-display device and another map search-and-display device. Subsequently, where it is undesirable to perform map search by displaying the separate-frame window, another map-search display device can be selected. That is to say, a predetermined map-search device can be selected according to various circumstances.

Preferably, the map search-and-display apparatus further comprises a display switch device for switching from separate-frame display to two-point display after the map search-and-display is finished. Subsequently, where the above-described map search is finished, the separate-frame-window display for showing the detailed map is changed to the two-point display automatically or manually by the user. Therefore, the map search-and-display apparatus becomes easy to operate and produces a map easy to understand.

As has been described, aspects of the present invention allow for the displaying of two points distant from each other on a single screen, so as to know the position relationship between the two points, which is suitable for the case where the cursor position gradually moves away from the current position, which makes it necessary to scroll a map for making a search. Aspects of the present invention further allow for the displaying of detailed maps for the two points with reference to the two points shown on the above-described screen, so that the user can easily observe the detailed maps without performing complicated operations to switch between various maps.

BRIEF DESCRIPTION OF THE DRAWINGS

FIG. 16 shows another example map image displayed through the map-search process performed by moving the cursor in a known navigation apparatus.

DESCRIPTION OF THE PREFERRED EMBODIMENTS

Figure 1:
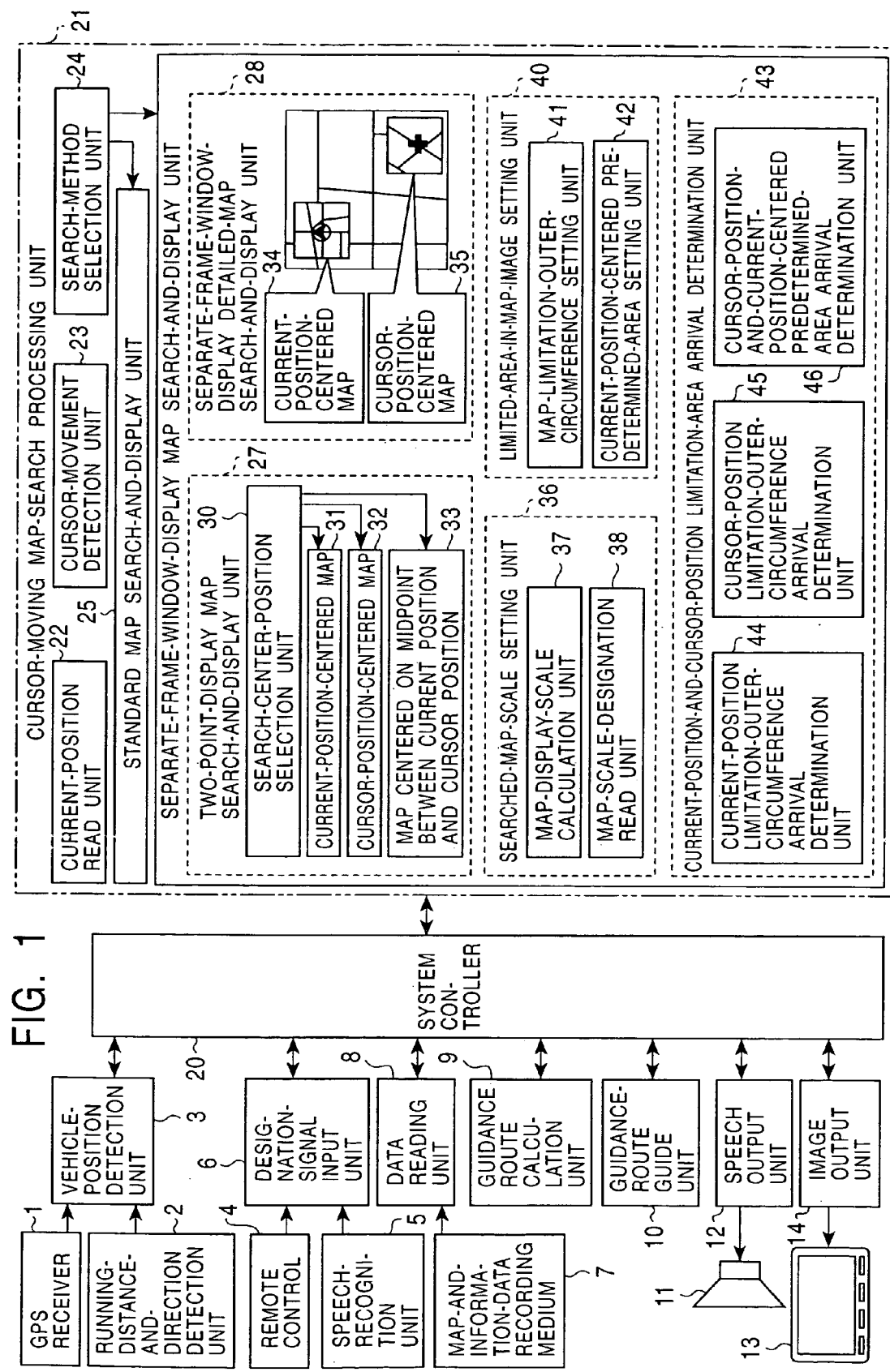
FIG. 1 is a functional block diagram of a navigation apparatus for performing a cursor-moving map search process according to an embodiment of the present invention.

Embodiments of the present invention will now be described with reference to the attached drawings. In a navigation apparatus according to a first embodiment of the present invention, map search is performed by moving a cursor. FIG. 1 is a functional block diagram illustrating main functions of the navigation apparatus. The main functions are provided mainly for performing cursor-moving map-search process. Functional units shown in this drawing are means for performing the main functions.

In this drawing, a system controller 20 includes a ROM storing software for performing various predetermined functions, a CPU for processing the software, and so forth, for controlling functional units connected thereto. In this navigation apparatus, a vehicle-position detection unit 3 is connected to the system controller 20, data on the position of a GPS receiver 1 is inputted to the system controller 20, and vehicle-moving data from a running-distance-and-direction detection unit 2 obtained through a vehicle-speed sensor and an angle sensor is inputted to the system controller 20, as required, for detecting the current position of a vehicle. Further, an indication signal is inputted to an indication-signal input unit 6 by a user through a remote control or the like so that the indication-signal input unit 6 can output a cursor-scroll signal by operating a joystick or the like of the remote control for performing cursor-moving map search. The cursor-moving map search will be described later in detail. A signal of a speech-recognition unit 5 for inputting an indication signal of the user through a process for recognizing speech of the user is inputted to the designation-signal input unit 6, as required.

A data capture unit 8 captures map data, facility information, and so forth, from a map-and-information-data recording medium 7 including a DVD-ROM, a CD-ROM, a hard disk, and so forth. Further, where data can be written into the data recording medium, as is the case with the hard disk, the data capture unit 8 can input data to the data recording medium for reading and using externally obtained data and data processed by other functional units. In the present invention, where a signal for scrolling a map by moving the cursor is transmitted from the indication-signal input unit 6 to the system controller 20, the data capture unit 8 captures a predetermined scale map corresponding to the cursor position from the map-and-information-data recording medium 7.

A guidance-route calculation unit 9 captures the vehicle current position detected by the vehicle-position detection unit 3 and captures destination information set by scrolling the map through cursor operation that will be described later, inputting the destination address or the telephone number, and so forth. Then, the guidance-route calculation unit 9 calculates and displays the most suitable guidance route that matches various conditions including the minimum amount of time, the shortest distance, an ordinary-road priority, and so forth. Further, a guidance-route guide unit 10 guides the vehicle to the destination with safety according to a guidance route calculated by the guidance-route calculation unit 9 and selected and pointed by the user. A speech output unit 12 for outputting speech including various guidance via a speaker 12 and an image-output unit 14 for displaying a map that will be described later and various information on a monitor 13.

A cursor-moving map-search processing unit 21 includes a current-position read unit 22 for reading the current-position data from the vehicle-position detection unit 3 and a cursor-moving detection unit 23 for capturing the cursor position for scrolling the map pointed by the point-signal input unit 6 and detecting the cursor-moving direction or the like. Further, a detection-method selection unit 24 selects between a process performed by a standard map-search-and-display unit 25 for searching and displaying a map according to a known method and a process performed by a separate-frame-window-display map search-and-display unit 26 for displaying a detailed map in a separate-frame window for the current position and the cursor position, so as to perform the cursor-moving map search that will be described later. This selection is performed according to an instruction or the like transmitted from the user. The standard map-search-and-display unit 25 can use various known cursor-moving map-search methods and particularly can use the known map-search method disclosed in Japanese Unexamined Patent Application Publication No. 2002-286467.

The separate-frame-window-display map search-and-display unit 26 for performing the main functions of the present invention includes a two-point-display map search-and-display unit 27 and a separate-frame-window-display detailed-map search-and-display unit 28. The two-point-display map search-and-display unit 27 searches for and displays a map including the current position and the cursor position on a single screen. The separate-window-display detailed-map search-and-display unit 28 searches and displays a current-position-centered detailed map and a cursor-position-centered detailed map.

The two-point-display map search-and-display unit 27 includes a search-center-position selection unit 30 for selecting from among a current-position-centered map search-and-display unit 31, a cursor-position-centered map search-and-display unit 32, and a midpoint-centered map search-and-display unit 33 for searching and displaying a map centered on a midpoint between the current position and the cursor position. The current-position-centered map search-and-display unit 31 searches and displays a current-position-centered map based on data transmitted from the current-position read unit 22. The cursor-position-centered map search-and-display unit 32 searches and displays a cursor-position-centered map based on data transmitted from the cursor-movement detection unit 23. Further, the mid-point-centered map search-and-display unit 33 searches and displays a map centered on a point between the current and cursor positions based on data on the current and cursor positions. The above-described map search-and-display units search a map on a predetermined scale according to the settings determined by a searched-map-scale selection setting unit 36 that will be described later.

The separate-frame-window-display detailed-map search-and-display unit 28 includes a current-position-centered map search-and-display unit 34 and a cursor-position-centered map search-and-display unit 35. In principle, the current-position-centered map search-and-display unit 34 displays a detailed map on the smallest scale in a separate-frame window at the current position on a map on which both the two points searched by the two-point-display map search-and-display unit 27 are displayed. Further, in principle, the cursor-position-centered map search-and-display unit 35 displays another detailed map on the smallest scale in a separate-frame window at the cursor position on the screen, as is the case with the current-position-centered map.

The separate-frame-window-display map search-and-display unit 26 includes the searched-map-scale selection-and-setting unit 36. Therefore, where the two-point-display map search-and-display unit 27 searches various maps and a current-position-and-cursor-position limitation-area arrival determination unit 43 that will be described later determines that the current position and the cursor position arrives at a limitation area set by a limitation-area-in-map-image setting unit 40, the searched-map-scale selection-and-setting unit 36 selects and sets a map scale suitable for predetermined conditions, as a main process. Where the cursor-position-centered map search-and-display unit 32 searches the map, a map-display-scale display-scale calculation unit 37 calculates the scale of a cursor-position-centered map showing the current position on the same screen. Further, where the midpoint-centered map search-and-display unit 33 searches the map, a midpoint between the current position and the cursor position is determined to be a center. Subsequently, the map-display-scale calculation unit 37 calculates the scale of a map on which the current position and the cursor position can be displayed.

The limitation-area-in-map-image setting unit 40 sets a limitation area for detecting that the current position and the cursor position enter a predetermined area on the map image by moving the cursor within the map screen. A map-limitation-outer-circumference setting unit 41 sets a predetermined area surrounding the displayed map, as a limitation area. Further, a current-position-centered predetermined-area setting unit 42 sets a predetermined area centered on the displayed current position.

The current-position-and-cursor-position limitation-area arrival determination unit 43 determines whether or not the current position and the cursor position arrive at the limitation area set by the limitation-area-in-map-image arrival setting unit 40. A current-position limitation-outer-circumference arrival determination unit 44 in the current-position-and-cursor-position limitation-area arrival determination unit 43 determines whether or not the current position arrives at the limitation outer circumference set by the map-limitation-outer-circumference setting unit 41. Further, a cursor-position limitation-outer-circumference arrival determination unit 45 determines whether or not the cursor position arrives at the limitation outer circumference. A cursor-position-and-current-position-centered predetermined-area arrival determination unit 46 determines whether or not the cursor position comes near the current position and arrives at the predetermined area set by the current-position-centered predetermined-area setting unit 42.

The navigation apparatus including the above-described functional units can be operated according to operation flowcharts shown in FIGS. 2, 3A, 4A, and 5. The operation of the navigation apparatus will now be described with reference to the functional block diagram shown in FIG. 1 and various example screen images shown in FIGS. 6 to 12. Where a map is searched by moving a cursor according to the flowchart shown in FIG. 2, a current position is detected and set, as a first process (act S1). This process can be performed by the current-position read unit 22 for reading the current position detected by the vehicle-position detection unit 3 shown in FIG. 1. This process can also be performed by the user, where the user designates and determines a predetermined position to be the current position. Because the current position is used for various processes, the data on the current position is stored.

Figure 15A:
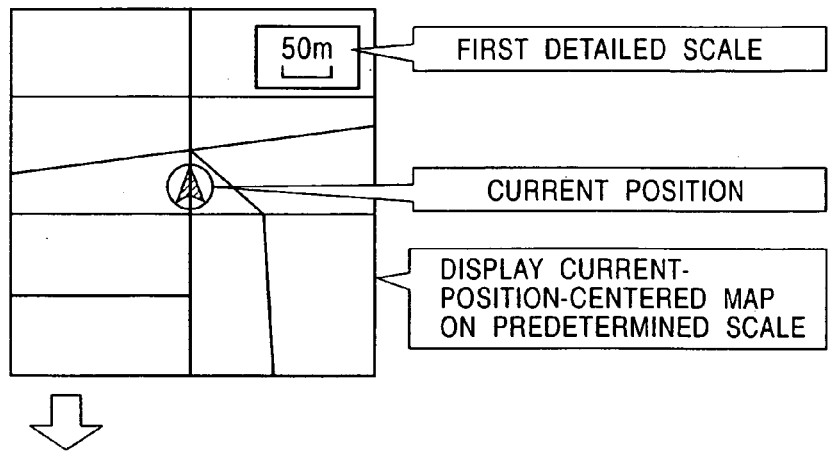
FIG. 15 shows an example map image displayed through a map-search process performed by moving a cursor in a known navigation apparatus.
Figure 15B:
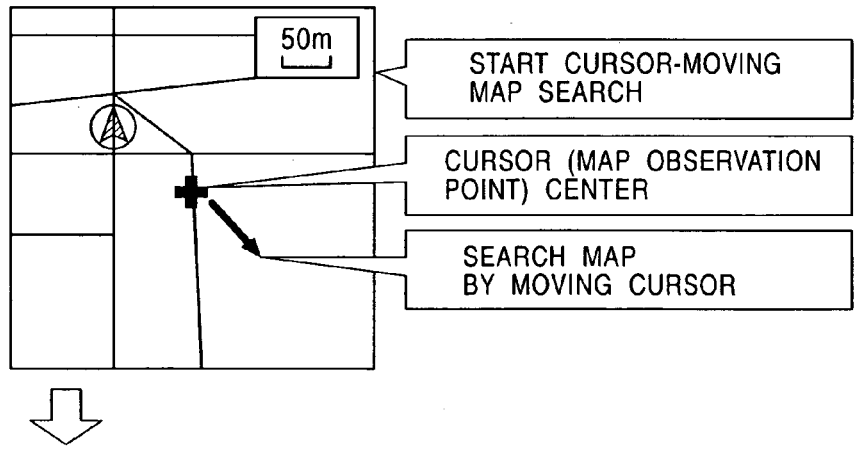

Then, a designated scale is read and the current-position-centered map on the read scale is displayed on a monitor (act S2). This scale is designated for a first map displayed for the cursor-moving map-search process, so as to correspond to the most detailed of all maps set beforehand, for example. As a result, as in the case of the known example shown in FIG. 15A, for example, a current-position centered and most-detailed map, that is, a first detailed-scale map is displayed, so as to display two points. This process is performed according to the following manner. The standard map search-and-display unit 25 shown in FIG. 1 uses the function of the two-point-display map search-and-display unit 27, the search-center-position selection unit 30 selects the current-position-centered map search-and-display unit 31, and the searched-map-scale selection setting unit 36 searches a map on a designated scale read by a map-scale designation-and-read unit 38.

Figure 3A:
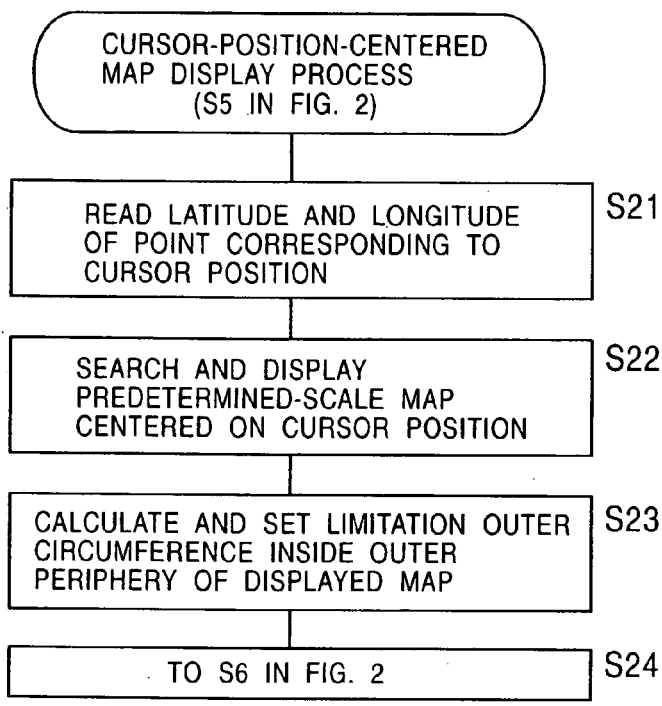
FIG. 3 is an operation flowchart illustrating a cursor-position-centered map display process, as a part of the operation flowchart shown in FIG. 2.
Figure 3B:
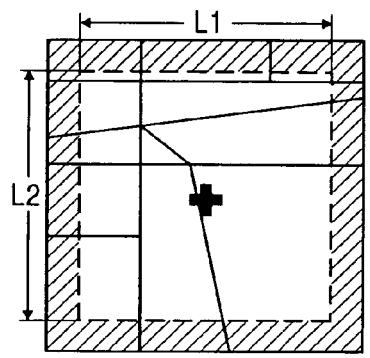
Figure 5:
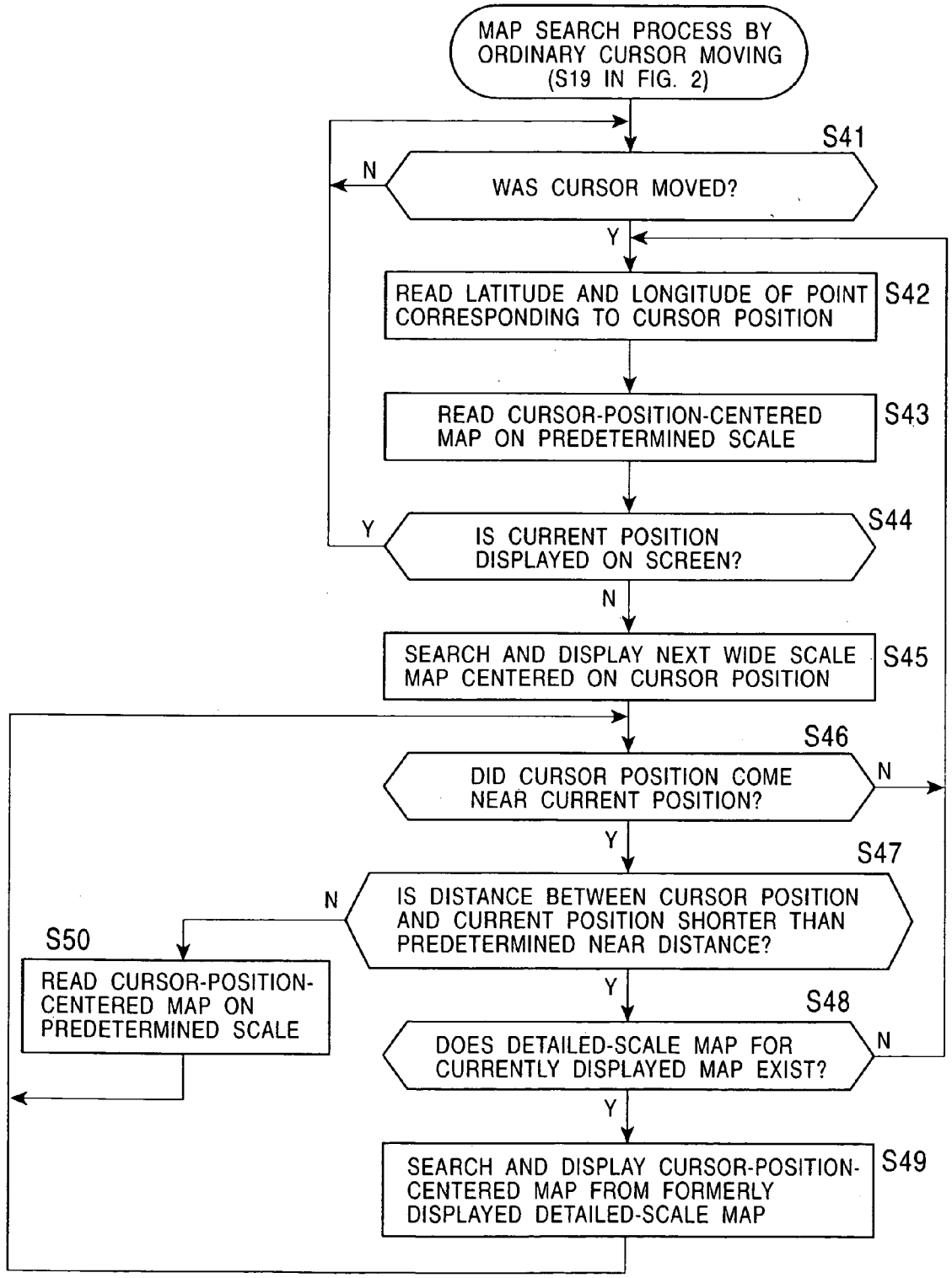
FIG. 5 is an operation flowchart illustrating a map search process by ordinary cursor moving, as another part of the operation flowchart shown in FIG. 2.

Then, it is determined whether or not a separate-window display process should be performed (act S3). This determination can be performed by detecting whether or not the user selects and inputs an instruction for performing separate-frame-window display. Where it is determined that the user does not want to perform the separate-frame-window display, a known and ordinary cursor-moving map-detection process is performed, as shown in FIG. 5 (act S19).

Where it is determined that the user wants to perform the separate-window display, it is determined whether or not the cursor moved (act S4). If it is determined that the cursor did not move, this process is repeated until the cursor moves. If it is determined that the cursor moved, a cursor-position-centered map display process is performed (act S5).

Where the cursor-position-centered map display process is performed, the latitude and longitude of a point corresponding to the cursor position are read, as shown in FIG. 3 (act S21). Then, the point is determined to be the center of the map, based on the latitude-and-longitude data, and the map on the designated scale read at act S2 is searched and displayed on the monitor (act S22). Then, a limitation outer circumference inside the outer-most circumference, which is the outer periphery of the displayed map, is calculated and set, as shown in FIG. 3B (act S23). This calculation is performed by the map-limitation-outer-circumference setting unit 41 shown in FIG. 1.

Figure 6A:
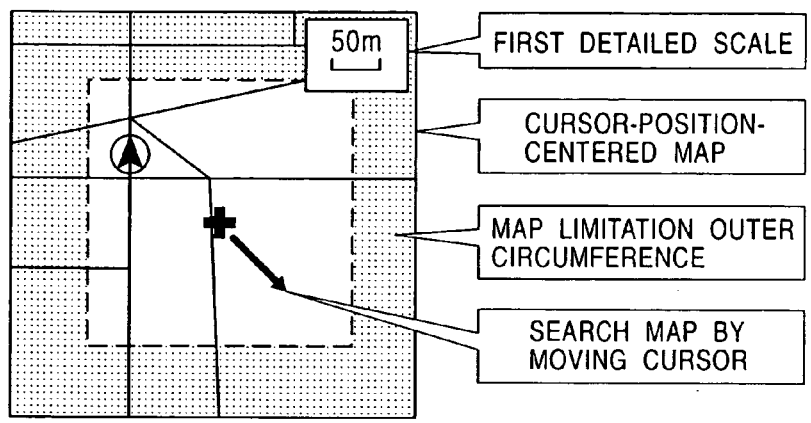
FIG. 6 shows an example map scroll-and-display process performed by moving a cursor according to an embodiment of the present invention.

As a result, hatched part other than an area of horizontal length L1×vertical length L2 around the center of the image is determined to be a limitation outer circumference. Subsequently, where the map is scrolled in relative to the movement of the cursor on the map, the cursor-position-centered map showing the moved current position is searched and displayed, as shown in FIG. 6A. Although this map is not shown on the screen, the above-described limitation circumference exists. After the above-described process is performed, the process advances to act S6 shown in FIG. 2 (act S24).

Then, it is determined whether or not the current position is in the limitation outer circumference, that is to say, whether or not the current position is in the limitation outer circumference other than the L1×L2 area shown in FIG. 3B (act S6). Where the current position is not in the limitation outer circumference, as in the case of FIG. 6A, the process returns to act S4, so that the above-described operations are repeated. For performing this process, the search-center-position selection unit 30 selects the cursor-position-centered map search-and-display unit 32. The selected cursor-position-centered map search-and-display unit 32 searches a cursor-position-centered map on the above-described scale.

Figure 6B:
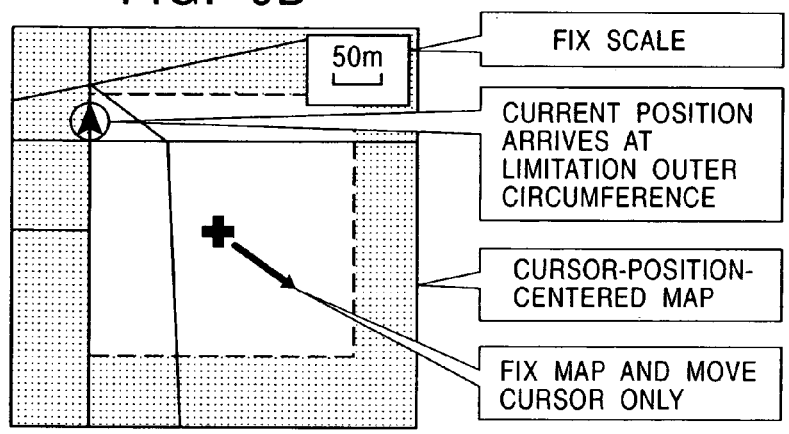
Figure 6C:
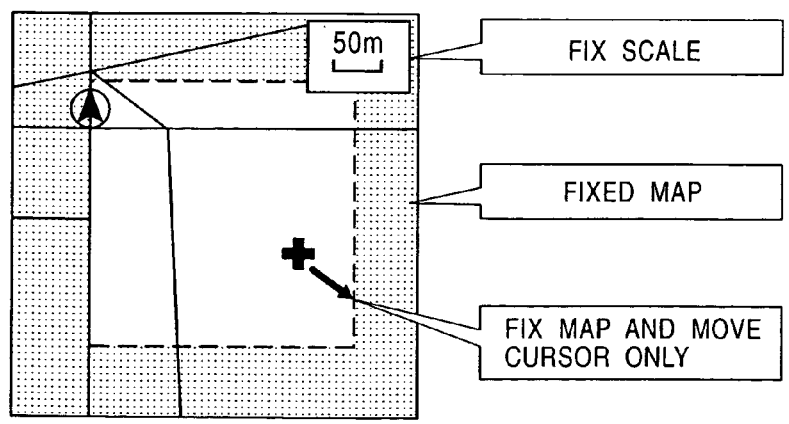

FIG. 6B shows the state of the cursor-position-centered map after the above-described process. Where it is determined that the current position comes in the limitation outer circumference, at act S6, the cursor-position-centered map is fixed, as it is, as shown in FIGS. 6B and 6C, and only the cursor is moved on the same map according to the operation of the user (act S7). For performing this process, the current-position limitation-outer-circumference arrival determination unit 44 determines whether or not the current position arrives at the limitation outer circumference set by the map-limitation-outer-circumference setting unit 41.

Figure 7A:
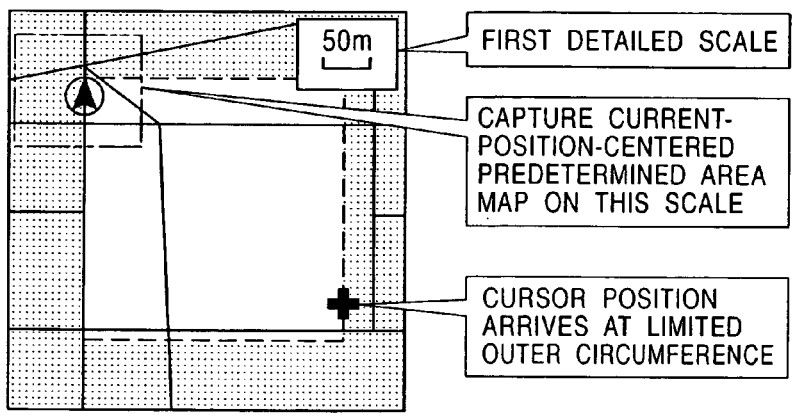
FIG. 7 shows another example map scroll-and-display process performed by moving the cursor according to an embodiment of the present invention.

Then, it is determined whether or not the cursor position is in the limitation outer circumference (act S8). Where the current position is not in the limitation outer circumference, as shown in FIG. 6C, the process advances to act S17. Then, it is determined whether or not the cursor position is near the current position. Where the cursor position is not near the current position, the process returns to act S7 and the above-described operation is repeated. Where it is determined that the cursor position is near the current position, at act S17, a predetermined process is performed, which will be described later in detail.

Where the map state becomes as that shown in FIG. 7A, for example, at act S8, and it is determined that the cursor position is in the limitation outer circumference, a midpoint between the current position and the cursor position is determined to be a center point. Then, a wide-area map on a predetermined scale for showing the current position and the cursor position is searched and displayed on the screen. For performing the above-described process, first, the cursor-position limitation-outer-circumference arrival determination unit 45 shown in FIG. 1 determines whether or not the cursor position arrives at the limitation outer circumference set by the map-limitation-outer-circumference setting unit 41. Then, the map-display-scale calculation unit 37 calculates and sets the scale of a midpoint-centered map showing both the positions on the same screen, and the search-center-position selection unit 30 selects the midpoint-centered map search-and-display unit 33. Then, the midpoint-centered map search-and-display unit 33 searches a map on the calculated and set scale.

Figure 7B:
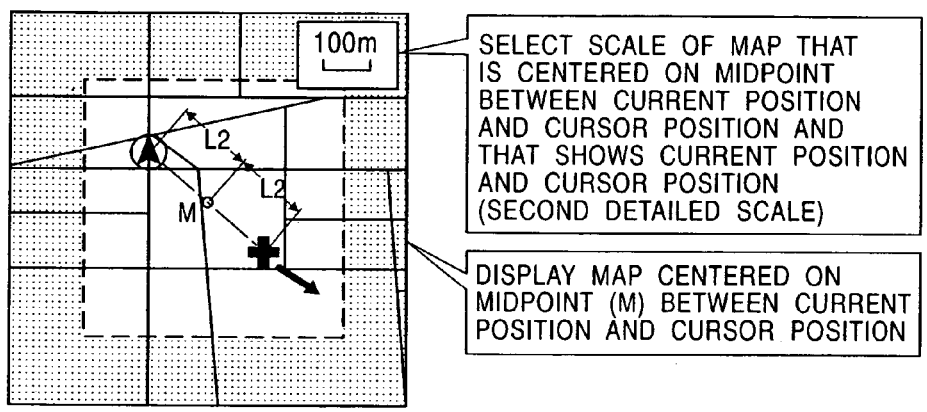

As a result, a map centered on midpoint M between the current position and the position of the cursor arrived at the limitation outer circumference is displayed, as shown in FIG. 7A, for showing the two points. The scale of the above-described map is changed from the first detailed scale to a second detailed scale, as shown in FIG. 7B. Further, the distance between the current position and the midpoint M is the same as that between the cursor position and the midpoint M. Each of the distances is referred to as equal distance L2.

Figure 4A:
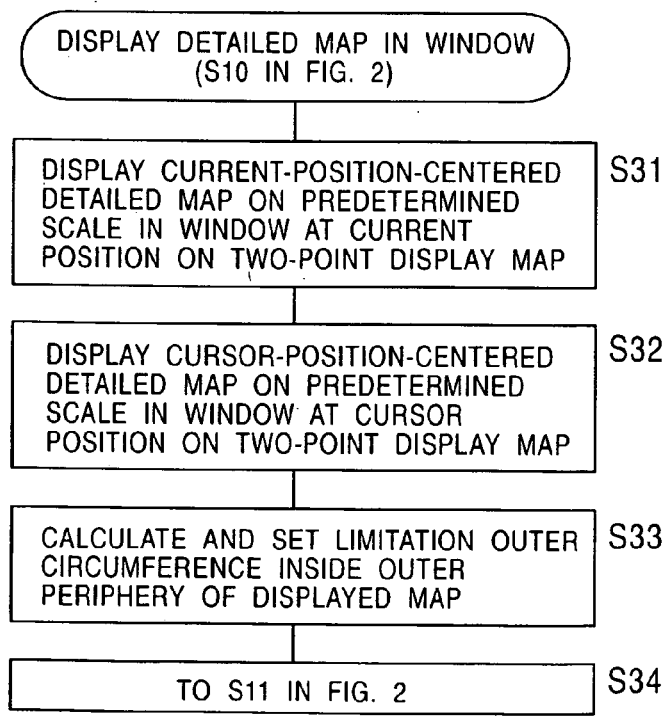
FIG. 4 is an operation flowchart illustrating a detailed-map-window display process, as another part of the operation flowchart shown in FIG. 2.
Figure 4B:
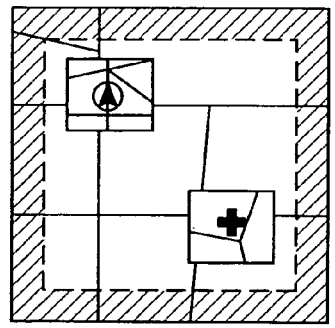

Then, a process for displaying a detailed map in a window is performed, as shown in FIGS. 4A and 4B (act S10). In this example, first, the current-position-centered detailed map on a predetermined scale is displayed in a separate-frame window on the current position on the two-point display map (act S31). Then, the cursor-position-centered detailed map on a predetermined scale is displayed in a separate-frame window on the cursor position on the two-point display map, as is the case with the current position (act S32). Here, either the process at act S31 or the process at act S32 can be performed prior to the other. Then, in an example shown in these drawings, a limitation outer circumference is calculated and set, so as to be defined inside the outer periphery of the displayed map, as is the case with act S23 shown in FIG. 3B. Then, the process advances to step S11 shown in FIG. 2 (act S34).

Figure 7C:
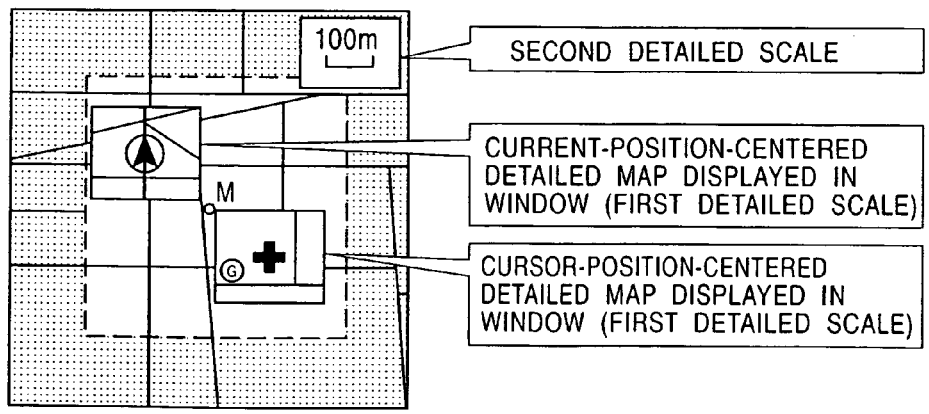

FIG. 7C illustrates the map displayed. That is to say, where the current position arrives at the limitation outer circumference, as in the current-position-centered window-display detailed map shown in FIG. 7A, the map showing a predetermined area centered on the fixed current position is captured. Further, a map showing this part on the first detailed scale is stored in a storage unit. Subsequently, the captured area on the first detailed scale is displayed in a separate-frame window on the current position on a second detailed scale map, as shown in FIG. 7C.

Figure 15C:
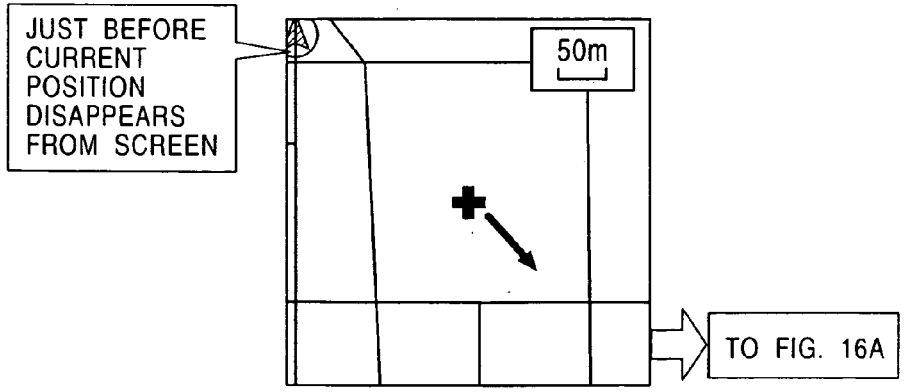

The limitation outer circumference is set so that the current-position-centered map can be captured immediately on the screen. It is arranged that the current position does not come in the limitation outer circumference. Therefore, where a functional unit for capturing a map image showing a predetermined current-position-centered area is provided, it becomes possible to capture a map showing a predetermined area, as shown in FIG. 15C. This predetermined area is centered on the current position that arrives at the outer-most periphery of the screen before disappearing from the screen. In this case, the setting of the limitation outer circumference becomes unnecessary and the determination whether or not the current position arrived at the limitation outer circumference can be performed by determining whether or not the current position arrives at the outer-most periphery of the screen.

Figure 2:
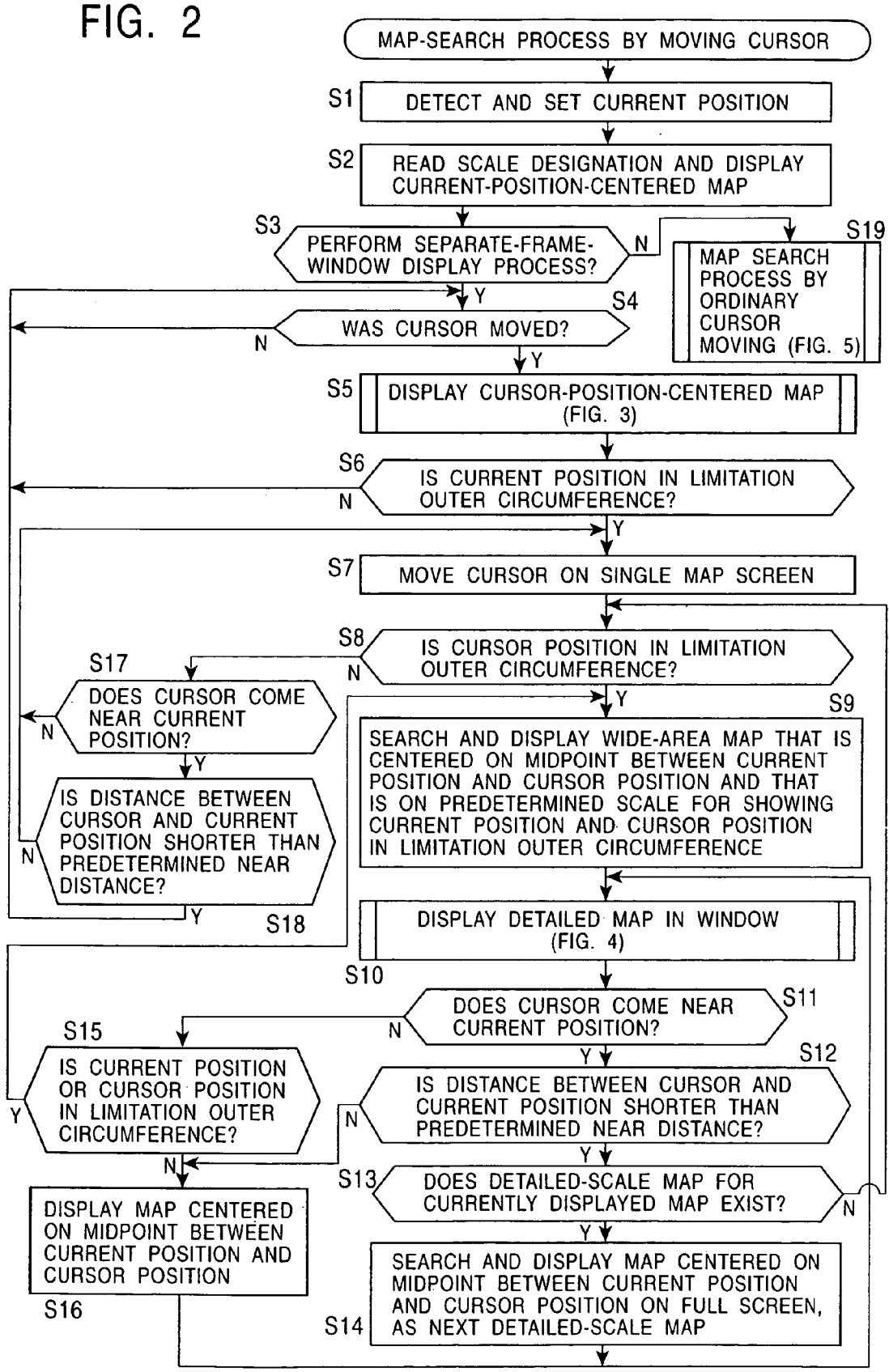
FIG. 2 is an operation flowchart showing the cursor-moving map search process according to an embodiment of the present invention.

It is determined whether or not the cursor position comes near the current position, at act S11 shown in FIG. 2. If it is determined that the cursor is not near the current position, the process advances to act S15 where it is determined that either the current position or the cursor position is in the limitation outer circumference. If it is determined that neither of them is in the limitation outer circumference, the map centered on the midpoint between the current position and the cursor position is displayed, with reference to the cursor movement (act S16).

Then, a detailed-map window display process is performed, as shown in FIGS. 4A and 4B. That is to say, detailed maps showing the current position and the cursor position are displayed on a map that is searched and displayed with reference to the cursor movement. The above-described displayed current-position detailed map was captured beforehand. As for the cursor-position detailed map, a detailed map showing a point where the cursor exists is searched and displayed. Afterwards, where the cursor does not come near the current position and the current position, or the cursor position does not reach the limitation outer circumference, the above-described operation is repeated.

Figure 8A:
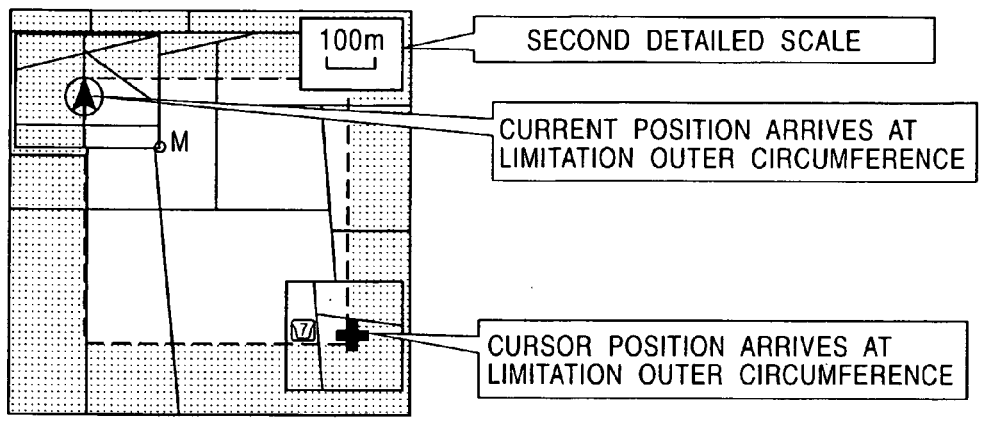
FIG. 8 shows another example map scroll-and-display process performed by moving the cursor according to an embodiment of the present invention.

Afterwards, where the current position or the cursor position arrives at the limitation outer circumference, as shown in FIG. 8A, it is determined that the current position, or the cursor position arrives at the limitation outer circumference, at act S15, whereby the process returns to act S9, so that the midpoint between the current position and the cursor position is determined to be the center, and the wide-area map on the predetermined scale for showing the current position and the cursor position in the limitation outer circumference is searched and displayed on the screen. Further, the detailed-map window display process is performed in the above-described manner, at act S10.

Figure 8B:
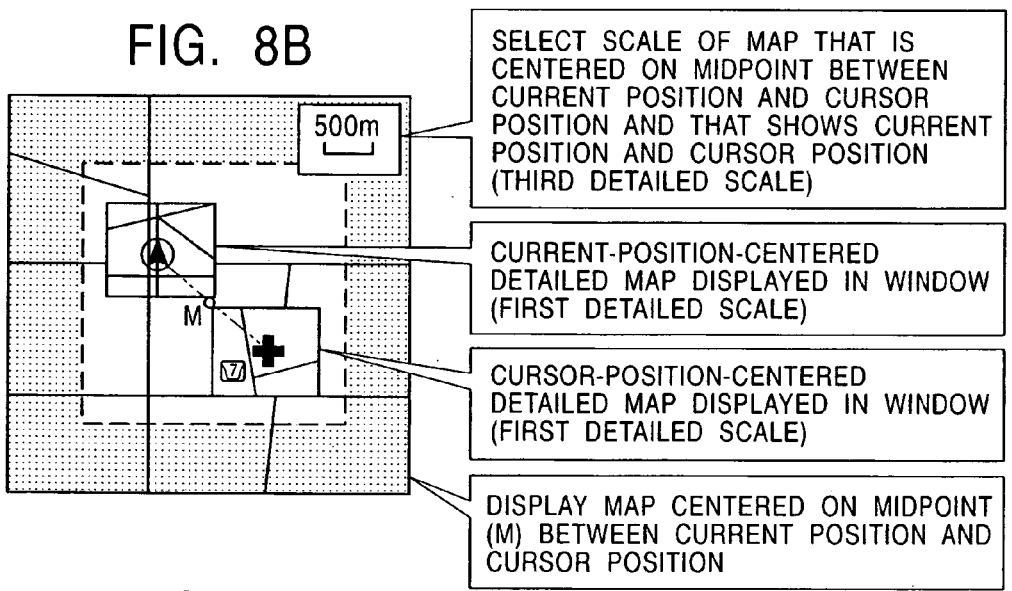
Figure 8C:
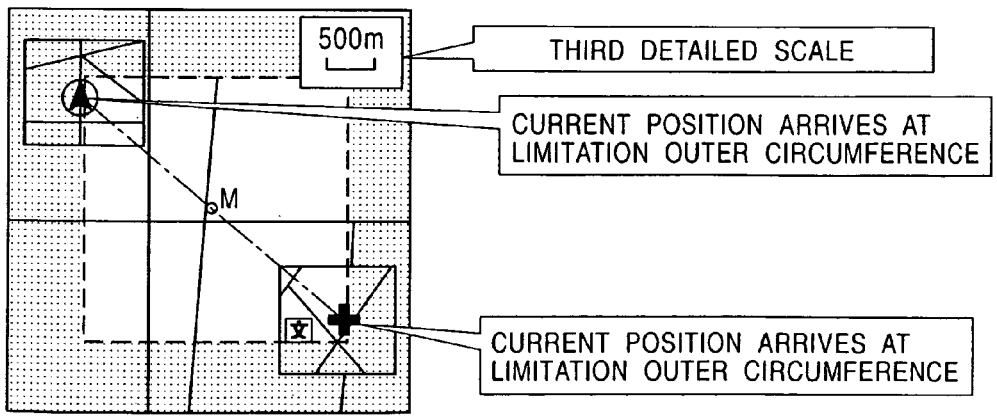

As a result, in an example shown in FIG. 8B, the midpoint M between the current position and the cursor position is determined to be a center point, and a map on a third detailed scale for showing the current position and the cursor position is selected. Subsequently, a map centered on the midpoint M between the current position and the cursor position is searched and displayed. Further, the captured map on the first-detailed scale is displayed in a window on the current position and a map on the first detailed scale for showing the point where the cursor exists is displayed in a window on the cursor position.

According to the above-described process, the displayed map becomes wider as the cursor moves. This process is performed without interruption as long as the cursor moves away from the current position, or the next wide-area map exists. A map on the first detailed scale is displayed in each of the separate-frame windows displayed on the current position and the cursor position. Therefore, the position relationship between the current position and the cursor position can be easily understood by one-screen display. Further, roads, facilities, and so forth, around the current position and the cursor position can be easily understood in detail, while studying the position relationship between the above-described positions, roads, and facilities. This is an advantage that cannot be obtained through a wide-area map.

Subsequently, it becomes unnecessary to move the cursor and change the map scale, which was performed repetitively in the past.

Figure 9A:
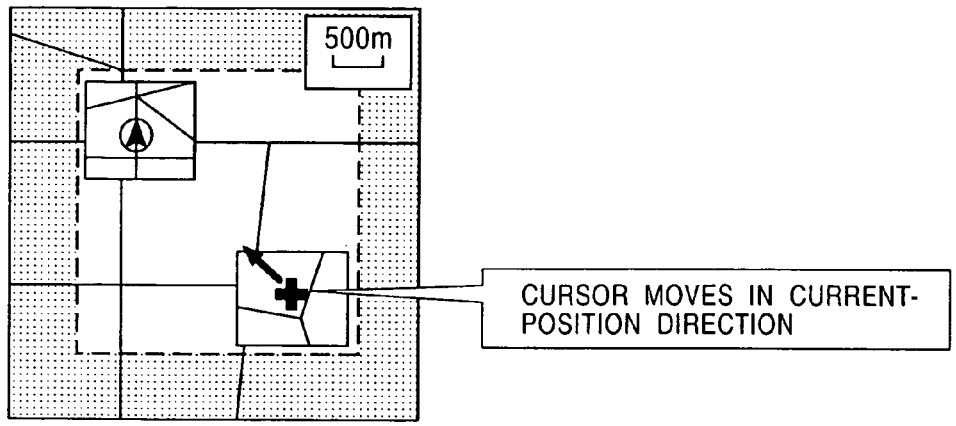
FIG. 9 shows another example map scroll-and-display process performed by moving the cursor according to an embodiment of the present invention.
Figure 9B:
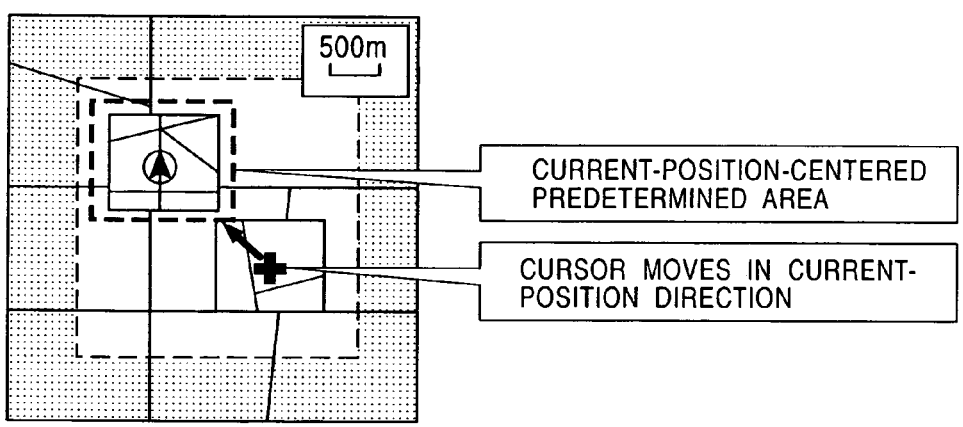
Figure 9C:
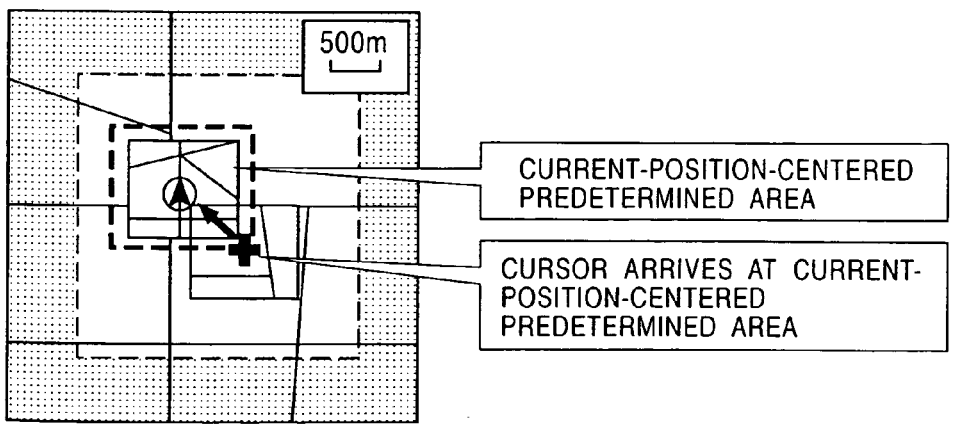

In the above-described series of operations, the cursor always moves away from the current position. However, where an appropriate destination is not found during the cursor is moved, the user moves the cursor to a predetermined position near the current position for searching a predetermined part near the current position. In this case, it is determined that the cursor comes near the current position, in act S11. FIGS. 9A to 9C show the above-described processes. FIG. 9A shows the state where the cursor starts moving in the current-position direction. Where the cursor comes near the current position in the above-described manner, it is determined whether or not the distance between the cursor and the current poison is shorter than a predetermined near distance, at step S12.

For performing the above-described process, the current-position-centered predetermined-area setting unit 42 sets a predetermined area centered on the current position and the cursor-position-and-current-position-centered predetermined-area arrival determination unit 46 determines whether or not the cursor arrives at the predetermined current-position-centered area that is set according to the above-described manner.

The above-described current-position-centered predetermined area can be set, as a rectangular area centered on the current position, as shown in FIG. 9B. However, this predetermined area can be set, as a circular area centered on the current position, where one of the radiuses thereof is the same as the other. Further, the size of the predetermined area can be arbitrarily determined so that two windows do not overlap with each other, even though the current position and the cursor position come near each other.

In the above-described determination process, where the cursor does not enter the predetermined area, as shown in FIGS. 9A and 9B, the process advances to act S16 for displaying the map centered on the midpoint between the current position and the cursor position. Then, the process advances to act S10 for performing the above-described process. Where the cursor moves away from the current position again, the process advances to act S15 for repeating the above-described process.

Where the cursor position comes near the current position and arrives at the current-position-centered predetermined area, as shown in FIG. 9C, it is determined that the cursor is in the predetermined distance near the current position, in act S12. Then, it is determined whether or not a detailed scale map for the currently displayed map exists. Where it is determined that the detailed scale map exists, a map centered on the midpoint between the current position and the cursor position is searched and displayed, as the next detailed scale map (act S14).

As a result, the third detailed-scale map shown in FIG. 9C is changed to the second detailed-scale map shown in FIG. 7C, for example, so that the current position and the cursor position are displayed on points corresponding to those shown in FIG. 9C. In this case, the state of the map is not limited to that shown in FIG. 7C, but can be shown in various ways corresponding to various types of cursor movement.

After that, the process returns to act S10, so that detailed maps are shown in windows at the current position and cursor position on the two-point display map. Then, the above-described operations are repeated. Further, where it is determined that a detailed scale map for the currently-displayed map does not exist, that is to say, the first detailed map is generated, at act S13, the process returns to act S5 for displaying the cursor-position-centered map. Then, the above-described operations are repeated.

Where it is determined that the cursor comes near the current position, at act S17, and it is determined that the cursor position is in the predetermined distance near the current position, at act S18, the process returns to act S4, so that the cursor-position-centered map is displayed, corresponding to the cursor movement. Then, the above-described operations are repeated. As a result, the cursor moves in a direction opposite to that in the above-described process, and the state of the cursor-position-centered map is changed from that shown in FIG. 6B to that shown in FIG. 6A. Otherwise, the cursor moves away from the current position again, whereby the above-described operations are repeated.

Figure 10A:
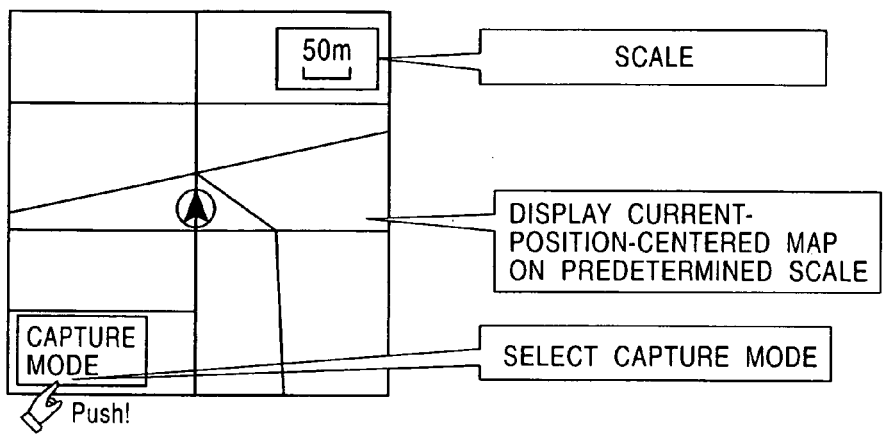
FIG. 10 shows another example map scroll-and-display process performed by moving the cursor according to an embodiment of the present invention.
Figure 10B:
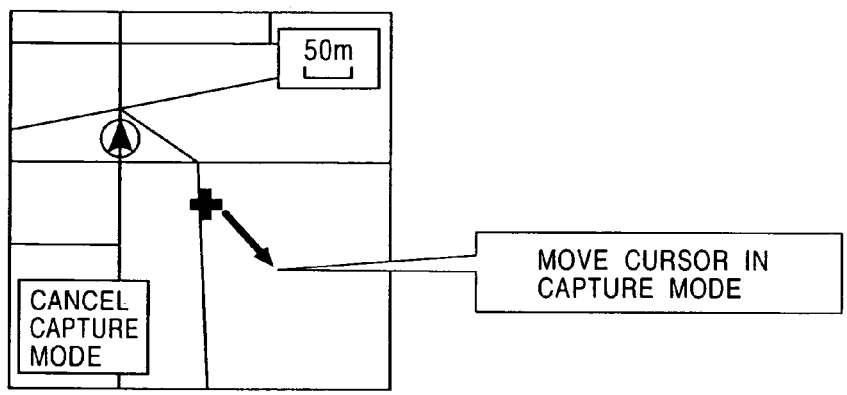
Figure 10C:
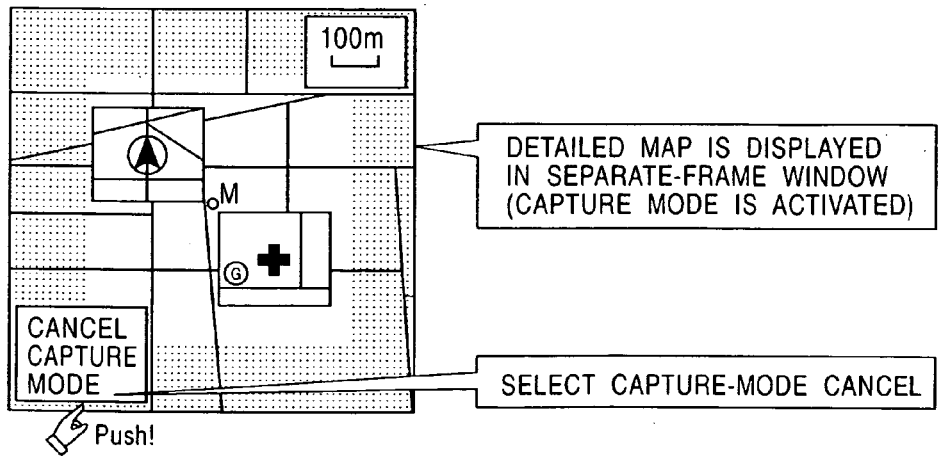
Figure 11A:
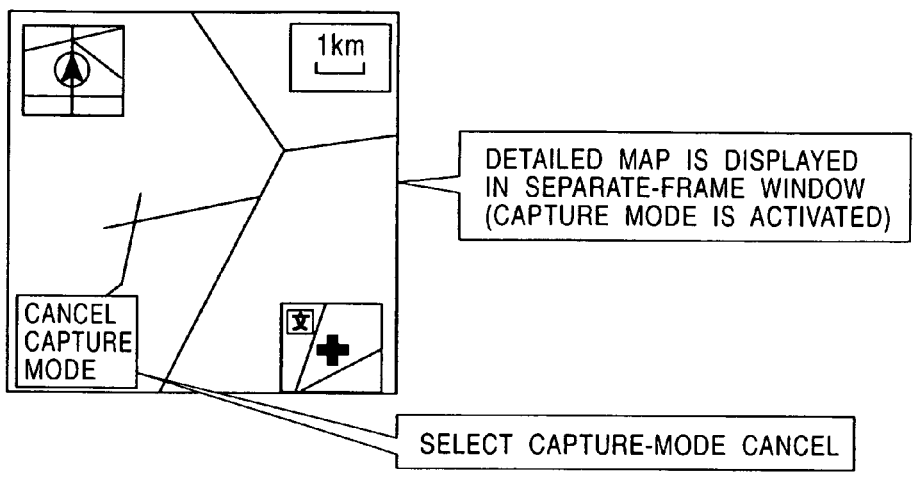
FIG. 11 shows another example map scroll-and-display process performed by moving the cursor according to an embodiment of the present invention.
Figure 11B:
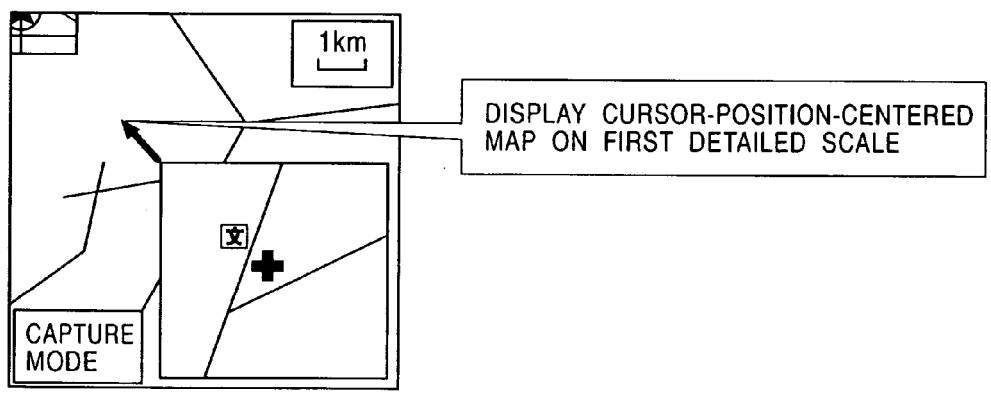

At act S3 shown in the operation flowchart shown in FIG. 2, it is determined whether or not the separate-frame-window display process should be performed, the instruction for performing the separate-frame-window display process transmitted from the user is detected, and the separate-frame-window display process is performed. However, the above-described instruction input can be performed by the user by operating an operation unit displayed on the screen, as shown in FIGS. 10A to 10C. That is to say, where the current-position-centered map is displayed, as shown in FIG. 10A, a touch panel is provided, as a mode selection-and-display unit, on the lower-left corner of the screen. This touch panel is pressed down for entering a "capture mode".

Where the above-described capture-mode unit is pressed down, the cursor movement is displayed, as shown in FIG. 10B. Subsequently, the above-described two-point display in the wide-area map and the separate-frame window display for the current position and the cursor position are performed. During the capture mode, a "cancel capture mode" sign is displayed on the mode selection-and-display unit. Therefore, when the user presses down the capture-mode cancel part, the displayed map is changed to a regular map search screen.

Where the user presses down the "cancel capture mode" sign during the capture mode is activated, as shown in FIG. 11A, the capture mode is terminated. Further, the upper-left corner of the separate-frame window showing the cursor position shown in FIG. 11A is continuously extended in the direction of the upper left corner of the screen. Further, the separate-frame window showing the current position gradually disappears from the screen. In this case, a warning beep or the like may be output for alarming the user.

Figure 11C:
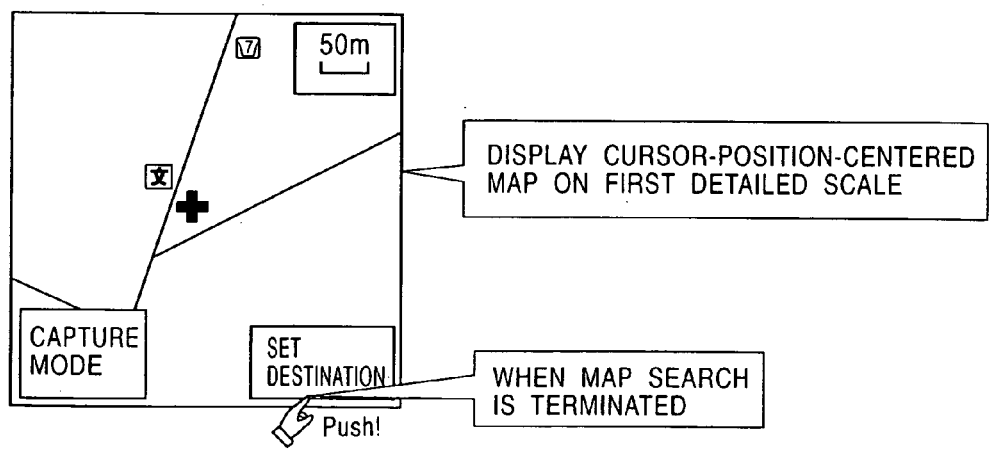

As a result, the first detailed map, that is, the most detailed map that is centered on the cursor position and that shows the two positions is automatically displayed, as shown in FIG. 11C. According to this embodiment shown in this drawing, a press-down operation unit shown as a "set destination" sign is displayed on the lower-right corner of the screen. Therefore, the user presses down the press-down operation unit, where the user wishes to determine the above-described searched point to be a destination.

The user may not provide an instruction for performing the above-described full-screen display of the cursor position. For example, it may be arranged that the capture mode is canceled, where a predetermined amount of time elapses after the cursor movement is stopped, that is to say, two seconds elapses after the cursor movement is stopped. Further, it may be arranged that the capture mode is selected again, where the cursor movement is started again in a predetermined amount of time after the capture mode is cancelled.

In the above-described embodiment, the detailed scale maps showing the current position and the cursor position are displayed in the separate-frame windows on the wide-area map showing the cursor position and the cursor position on the same screen. However, the detailed scale map may be displayed in the separate-frame window on only the current position, or the cursor position.

Figure 12A:
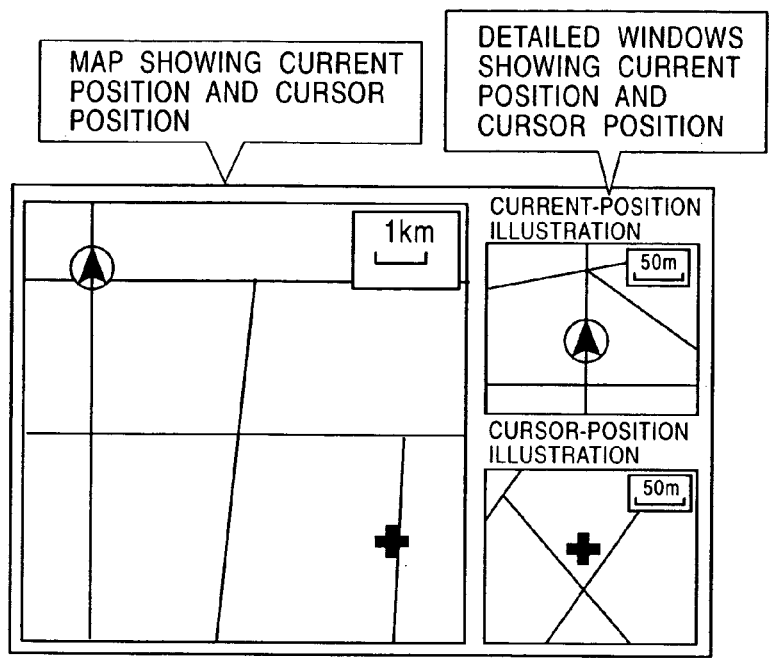
FIG. 12 shows another example map scroll-and-display process performed by moving the cursor according to an embodiment of the present invention.
Figure 12B:
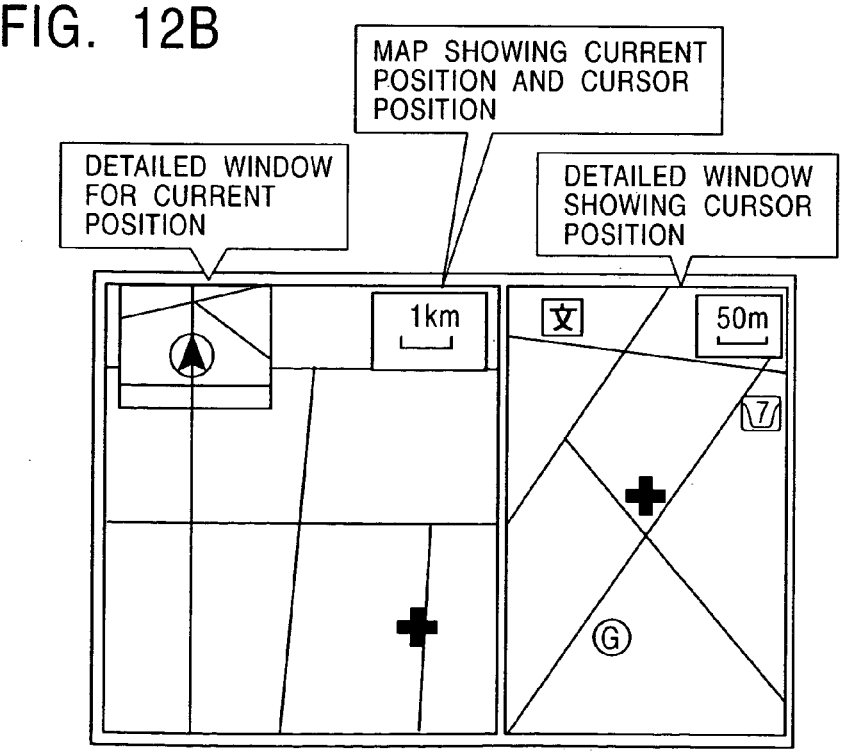

Because the size of a monitor screen of recent navigation apparatuses increases, it becomes possible to display many map images on a single screen. Therefore, it may be arranged that a map on a predetermined scale for showing both the current position and the cursor position is displayed on the left side of the screen, and the current position and the cursor position are displayed thereon. Further, it may be arranged that a detailed map on a predetermined scale for showing the current position is displayed in a separate-frame window and a detailed map on a predetermined scale for showing the cursor position is displayed in another separate-frame window, as shown in FIG. 12A. That is to say, a single screen may include the above-described three images. Accordingly, it becomes easier to see the wide-area map including the separate-frame windows on the screen showing the current position and the cursor position. Further, the map showing the current position and the cursor position may be displayed, as is the case with the above-described embodiments, and the detailed window showing the current position may be displayed in a separate frame at a predetermined position corresponding to the current position. As for the cursor position, a large detailed window centered on the cursor position may be displayed on the right side of the screen, as shown in FIG. 12B.

Where it is determined that a map-search process by ordinary cursor moving is performed, in act S19 of the operation flowchart shown in FIG. 2, the operations shown in FIG. 5 are performed. The operations can be easily performed by using the above-described functional units. For performing the ordinary-cursor-moving map-search process, first, it is determined whether or not the cursor was moved (act S41). Where the cursor was not moved, the above-described determination is repeated. When the cursor was moved, the latitude and longitude of a point corresponding to the cursor position are read (act S42). Then, a cursor-position-centered map on the predetermined scale read in act S2 shown in FIG. 2 is read (act S43).

Then, it is determined whether or not the current position is displayed on the screen (act S45). Where the current position is displayed, the process returns to act S41 for repeating the above-described operations. Where it is determined that the current position is not displayed on the screen, in act S44, the next cursor-position-centered wide-area-scale map is searched and displayed on the screen (act S45). Then, it is determined whether or not the cursor position comes near the current position. Where the cursor position is not near the current position, the process returns to act S42 again so that the latitude and longitude of the point corresponding the cursor position are read, and the cursor-position-centered map on the predetermined scale is read (act S43). Then, the above-described operations are repeated so that the map is changed to a wider map every time the current position disappears from the screen so that the current position and the cursor position are automatically displayed on a single screen at all times.

Where it is determined that the cursor position comes near the current position, in act S46, it is determined whether or not the distance between the cursor position and the current position is shorter than a predetermined display limitation area, in act S47, so as to determine whether or not the cursor is in a near limitation area set at a predetermined distance from the current position, as is the case with FIG. 9B. Where it is determined that the cursor is not in the predetermined distance from the current position, a cursor-position-centered map on a predetermined scale is read (act S50), and the process returns to act S46 for repeating the above-described operations.

Where it is determined that the cursor position is in the predetermined near distance from the current position, in act S47, it is determined whether or not a detailed scale map for the currently displayed map exists (act S48). Where the detailed scale map exists, a cursor-position-centered map is searched from a map displayed before the currently displayed map and displayed (act S49). Then, the process advances to act S46, and the above-described operations are repeated. Where it is determined that a map that is on a predetermined scale and that is more detailed than the currently displayed map does not exist, in act S48, the process returns to act S42 for performing map display that is the same as the first map display.

Accordingly, where the ordinary cursor-moving map search is performed, the position relationship between the current position and the cursor position can be easily understood through single-screen map display. The single-screen map display can be achieved by using the functional units used for performing the separate-frame-window display process.

Figure 13:
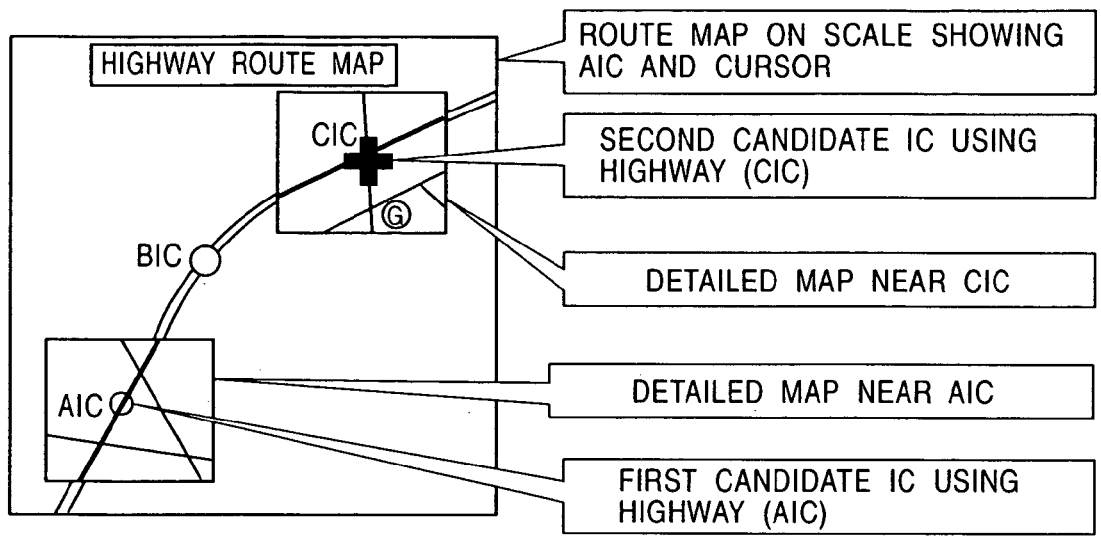
FIG. 13 shows a highway-route-map display process performed by the navigation apparatus according to an embodiment of the present invention.

According to the above-described embodiments, the present invention is used for the map search process performed by ordinary map scroll performed by moving a cursor. However, the present invention may be used for searching for an interchange displayed in a highway route map shown in FIG. 13, for example. For example, where a guidance route from the current position to a destination is set, the user is supposed to use an interchange A (AIC), and the user thinks that there might be a more convenient interchange, based on his experience, the user scrolls the highway route map and searches for another interchange. In this case, the AIC or a first candidate IC is handled as the current position described in the above-described embodiments. Therefore, a detailed map showing the road status around the AIC is displayed in a separate-frame window at the AIC position.

Where the user moves the cursor for searching for other ICs on the highway route map and points a predetermined IC, a detailed map around the pointed IC is displayed in a separate-frame window, as shown in FIG. 13. Therefore, it becomes possible to display the state of ordinary roads and particularly the road state around a predetermined IC in detail, which cannot be understood by the highway route map. Subsequently, the displayed map image is easy to use.

Figure 14:
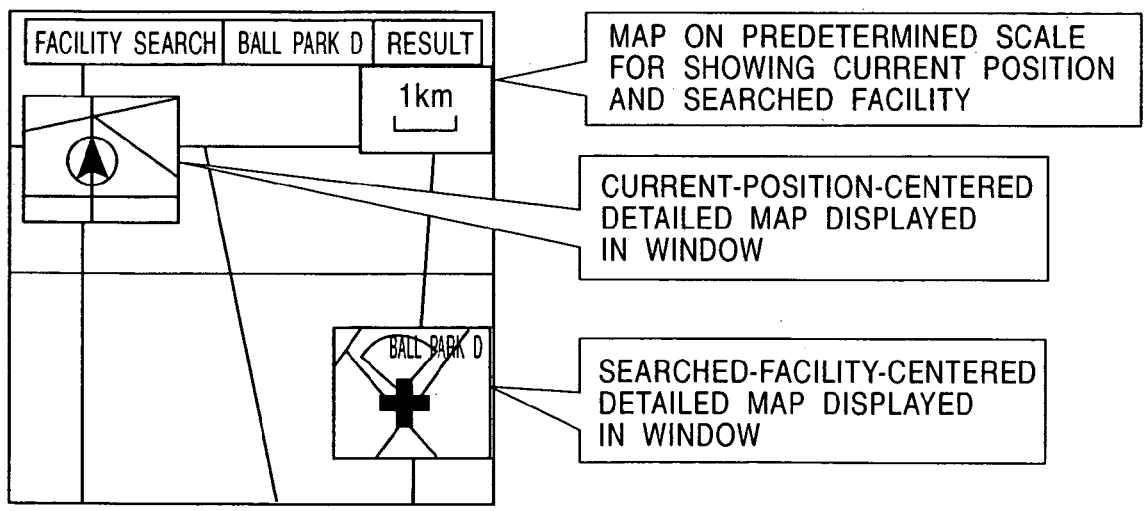
FIG. 14 shows a facility-search-result display process performed by the navigation apparatus according to an embodiment of the present invention.

Further, the present invention can be used for displaying a result of facility search, for example, as shown in FIG. 14. Where a search is made for a ball park D, a map on a predetermined scale is selected and displayed so that the current position and the searched ball park D are shown on a single screen. Further, each of detailed maps showing the current position and the ball park D is shown in a separate-frame window. Accordingly, it becomes possible to display an easy-to-read search-result display map by using the above-described functional units.

Although the present invention is used for the navigation apparatus in the above-described embodiments, it can be used for a personal computer, a mobile information terminal, and so forth, for displaying a map on the screen thereof.

It is to be understood that a wide range of changes and modifications to the embodiments described above will be apparent to those skilled in the art and are contemplated. It is therefore intended that the foregoing detailed description be regarded as illustrative, rather than limiting, and that it be understood that it is the following claims, including all equivalents, that are intended to define the spirit and scope of the invention.

What is claimed is:

1. A map search-and-display method comprising the acts of:
   displaying a two-point display map showing a first point and a second point at a distance from each other; and
   displaying a detailed map for the first point in a separate-frame window at a position on the two-point display map corresponding to the location of the first point.

2. The map search-and-display method of claim 1, wherein the first point indicates a current position and the second point indicates a cursor position provided for scrolling the two-point display map.

3. The map search-and-display method of claim 1, wherein the first point indicates a cursor position provided for scrolling the two-point display map and the second point indicates a current position.

4. The map search-and-display method of claim 1, wherein the first point indicates an interchange shown on a highway-route map and the second point indicates another interchange on the highway-route map.

5. The map search-and-display method of claim 1, wherein the first point indicates a current position and the second point indicates the position of a facility searched through facility search.

6. The map search-and-display method of claim 1, wherein the first point indicates the position of a facility searched through facility search and the second point indicates a current position.

7. A map search-and-display apparatus comprising:
   a two-point-display map search-and-display device operable to display a two-point display map showing a first point and a second point at a distance from each other; and
   a separate-frame-window-display detailed-map search-and-display device operable to display a detailed map for at least one of the two points in a frame separated from the two-point display map located on the two-point display map at a position proximate to said at least one of two points.

8. The map search-and-display apparatus of claim 7, wherein the first point indicates a current position and the second position indicates a cursor position provided for scrolling the two-point display map.

9. The map search-and-display apparatus of claim 7, wherein the first point indicates a first interchange shown on a highway-route map and the second point indicates a second interchange on the highway-route map.

10. The map search-and-display apparatus of claim 7, wherein the first point indicates a current position and the second point indicates the position of a facility searched through facility search.

11. The map search-and-display apparatus of claim 8, further comprising:
    an outer circumference of a screen image;
    a limitation-outer-circumference arrival determination device operable to determine if current position or the cursor position exists in the outer circumference of a screen image;
    a map search-and-display device operable to increase the distance shown on the map when the limitation-outer-circumference arrival determination device determines that the current position or the cursor position exists in the outer circumference.

12. The map search-and-display apparatus of claim 11, wherein the outer circumference is an outer-most circumference of the screen image.

13. The map search-and-display apparatus of claim 11, wherein the outer circumference is at a predetermined distance inside from the outer-most circumference.

14. The map search-and-display apparatus of claim 8, further comprising:
    a current-position-centered predetermined-area arrival determination device operable to determine whether the cursor position arrives at a predetermined area centered on the current position; and
    a map search-and-display device operable to increase the detail of a map a showing the first and second points if the current-position-centered predetermined-area arrival determination device determines that the cursor position arrives at the predetermined area.

15. The map search-and-display apparatus of claim 8, wherein the two-point-display map search-and-display device comprises a first current-position-centered map search-and-display unit operable to display a map centered on the current position; a second current-position-centered map search-and-display unit operable to display a map centered on the current position; a search-center-point selection unit operable to select from the first and second current-position-centered map search-and-display devices and display a map centered on the cursor position; and a midpoint-centered map search-and-display unit operable to display a map centered on a midpoint between the current position and the cursor position.

16. The map search-and-display apparatus of claim 7, further comprising a search-method selection device operable to select between the separate-frame-window-display detailed-map search-and-display device and another map search-and-display device.

17. The map search-and-display apparatus of claim 7, further comprising a display switch device operable to switch from separate-frame display to two-point display after the map search-and-display is finished.

18. A map search-and-display apparatus comprising:
    a two-point-display map search-and-display device operable to display a two-point display map showing a first point and a second point at a distance from each other; and
    a separate-frame-window-display detailed-map search-and-display device operable to display a detailed map in a separate frame for the first point and a detailed map in another separate frame for the second point.

19. The map search-and-display apparatus of claim 18, wherein the first point indicates a current position and the second position indicates a cursor position provided for scrolling the two-point display map.

20. The map search-and-display apparatus of claim 18, wherein the first point indicates a first interchange shown on a highway-route map and the second point indicates a second interchange on the highway-route map.

21. The map search-and-display apparatus of claim 18, wherein the first point indicates a current position and the second point indicates the position of a facility searched through facility search.

* * * * *